(12) United States Patent
Hirabayashi et al.

(10) Patent No.: US 10,048,387 B2
(45) Date of Patent: Aug. 14, 2018

(54) TERMINAL DEVICE AND ELEVATION VALUE ACQUISITION METHOD

(71) Applicant: HITACHI MAXELL, LTD., Ibaraki-shi, Osaka (JP)

(72) Inventors: Masayuki Hirabayashi, Ibaraki (JP); Yasunobu Hashimoto, Ibaraki (JP)

(73) Assignee: Maxell, Ltd., Kyoto (JP)

( * ) Notice: Subject to any disclaimer, the term of this patent is extended or adjusted under 35 U.S.C. 154(b) by 209 days.

(21) Appl. No.: 15/103,320

(22) PCT Filed: Jan. 15, 2014

(86) PCT No.: PCT/JP2014/050515
§ 371 (c)(1),
(2) Date: Jun. 10, 2016

(87) PCT Pub. No.: WO2015/107627
PCT Pub. Date: Jul. 23, 2015

(65) Prior Publication Data
US 2016/0306051 A1    Oct. 20, 2016

(51) Int. Cl.
*G01S 19/45* (2010.01)
*G01S 19/23* (2010.01)
(Continued)

(52) U.S. Cl.
CPC ............ *G01S 19/45* (2013.01); *G01C 5/06* (2013.01); *G01C 21/20* (2013.01);
(Continued)

(58) Field of Classification Search
CPC ......... G01S 19/48; G01S 19/45; G01S 19/235
(Continued)

(56) References Cited

U.S. PATENT DOCUMENTS 9,821,999 B2 * 11/2017 Rudow .................... B81B 7/02
2007/0030841 A1 * 2/2007 Lee ........................ G01S 5/0027
370/352
(Continued)

FOREIGN PATENT DOCUMENTS

JP    2005-069841 A    3/2005
JP    2005-156246 A    6/2005
(Continued)

OTHER PUBLICATIONS

International Search Report of PCT/JP2014/050515 dated Mar. 18, 2014.

*Primary Examiner* — Dao L Phan
(74) *Attorney, Agent, or Firm* — Mattingly & Malur, PC

(57) ABSTRACT

A terminal receives a GPS signal and a GPS correction signal, and a first elevation value calculation unit calculates an elevation value from the GPS signal and the GPS correction signal. The terminal includes an atmospheric pressure information detection unit that detects ambient atmospheric pressure information, and a second elevation value calculation unit for calculating an elevation value from the atmospheric pressure information. If a GPS correction signal can be received, the elevation value calculated by the first elevation value calculation unit is used as the elevation value of the current position and the calculated elevation value is used to calibrate the second elevation value calculation unit. If a GPS correction signal cannot be received, the elevation value calculated by the calibrated second elevation value calculation unit is used as the elevation value of the current position to acquire an accurate elevation value even when inside a building or tunnel.

20 Claims, 20 Drawing Sheets

(51) Int. Cl.
  *G01C 5/06* (2006.01)
  *G01S 19/48* (2010.01)
  *G01C 21/20* (2006.01)
  *G01C 21/36* (2006.01)
  *G01S 19/07* (2010.01)

(52) U.S. Cl.
  CPC .......... *G01C 21/3667* (2013.01); *G01S 19/07* (2013.01); *G01S 19/48* (2013.01)

(58) Field of Classification Search
  USPC ............ 342/357.28, 357.31, 357.62, 357.63; 701/468, 469
  See application file for complete search history.

(56) References Cited

U.S. PATENT DOCUMENTS

| 2009/0286556 | A1 | 11/2009 | Yumoto et al. |
| 2017/0045624 | A1* | 2/2017 | Drescher ................ G01S 19/44 |
| 2017/0202485 | A1* | 7/2017 | Takasu .................. A61B 5/1118 |

FOREIGN PATENT DOCUMENTS

| JP | 2005-337872 A | 12/2005 |
| JP | 2006-214993 A | 8/2006 |
| JP | 2009-281741 A | 12/2009 |
| JP | 2013-251830 A | 12/2013 |

* cited by examiner

FIG. 5
(a) RELATION OF ATMOSPHERIC PRESSURE AND ELEVATION
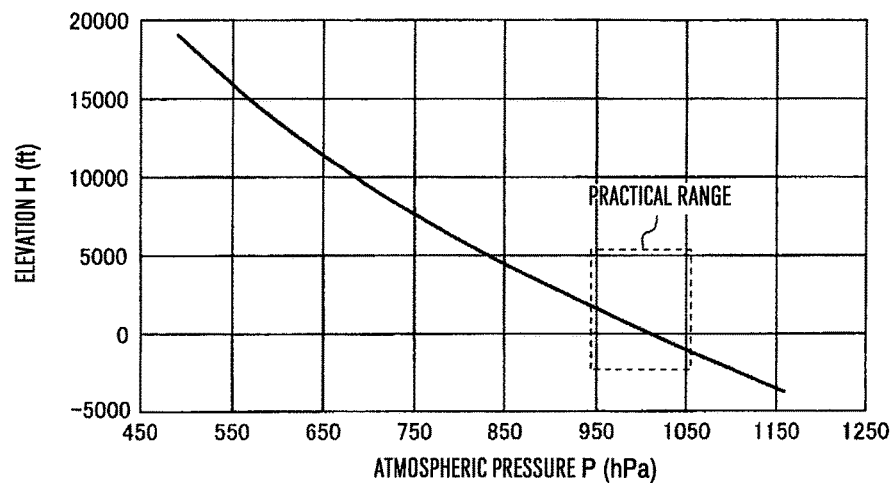
(b) EXTEND PRACTICAL RANGE
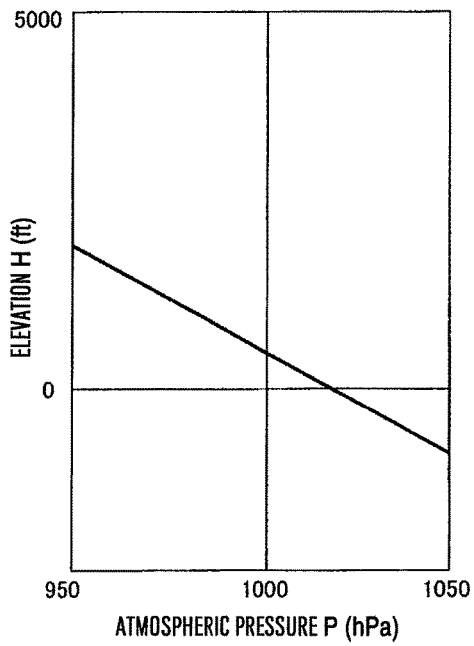
(c) CALIBRATION
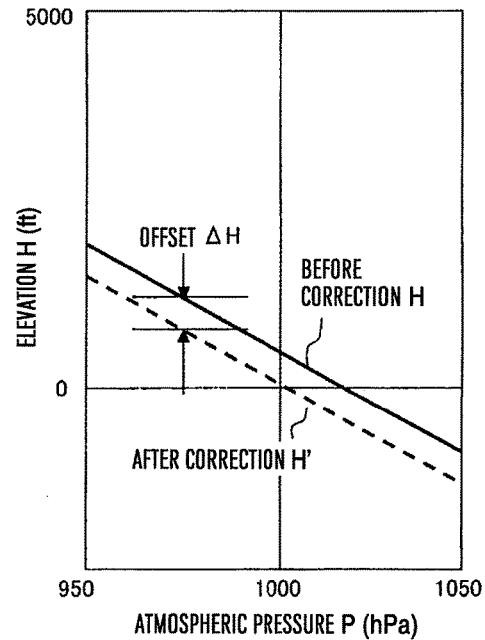

FIG. 6
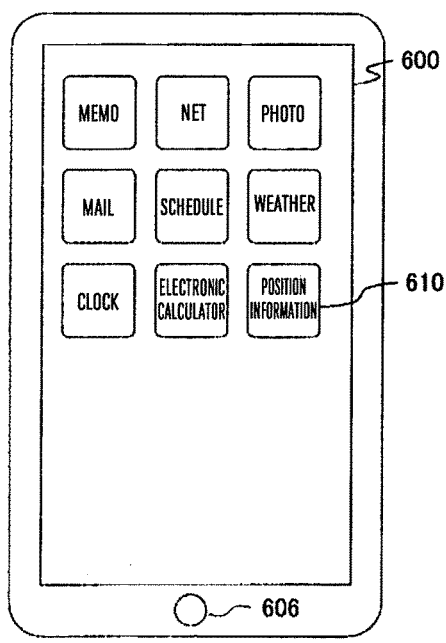
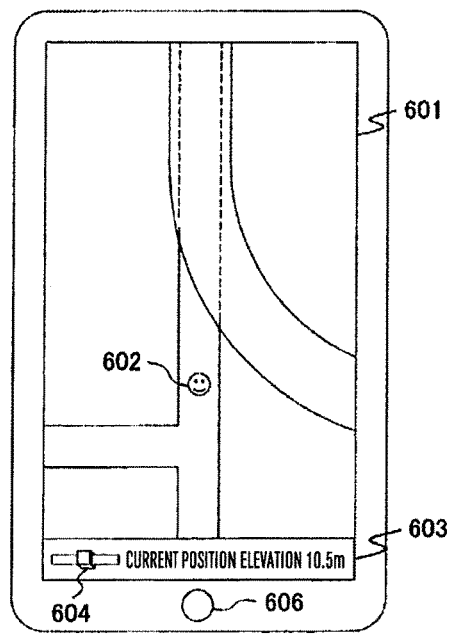
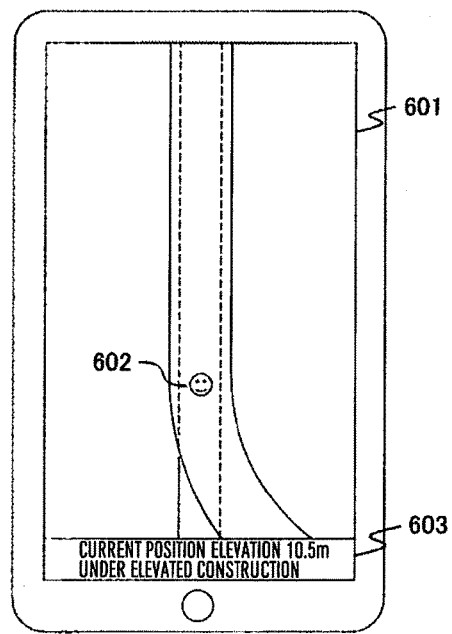

TERMINAL DEVICE AND ELEVATION VALUE ACQUISITION METHOD

TECHNICAL FIELD

The present invention relates to a terminal device and an elevation value acquisition method.

BACKGROUND ART

As a method of acquiring an elevation value of a current position of a pedestrian or a vehicle, a method using a GPS signal or a method using a barometer is known. For example, Patent Literature 1 discloses a configuration including an atmospheric pressure measurement unit to measure an atmospheric pressure, a GPS reception unit to receive GPS data from a GPS, and an operation unit to calculate a road elevation and/or a road gradient, on the basis of the atmospheric pressure measured by the atmospheric pressure measurement unit and the GPS data received by the GPS reception unit, as a road gradient measurement system for obtaining the road elevation or the road gradient. Here, the GPS data includes elevation data and the operation unit operates a tentative elevation from the atmospheric pressure, corrects the tentative elevation with the elevation data, and calculates the road elevation.

CITATION LIST

Patent Literature

PATENT LITERATURE 1: JP-A-2005-69841

SUMMARY OF INVENTION

Technical Problem

According to the technology disclosed in Patent Literature 1, the road elevation and/or the road gradient is calculated based on the atmospheric pressure measured by the atmospheric pressure measurement unit and the GPS data received by the GPS reception unit. However, when GPS data (GPS signal) cannot be received because a current position is, for example, inside a building or a tunnel, there is a problem that an calculated elevation value becomes inaccurate. In addition, there is a problem that an internal atmospheric pressure of the building or the tunnel may be different from an external atmospheric pressure and operation precision based on an atmospheric pressure becomes inaccurate.

An object of the present invention is to provide a terminal device and an elevation value acquisition method that can acquire an elevation value with high precision, even when a GPS signal cannot be received.

Solution to Problem

The present invention includes a plurality of unit to resolve the above problem. For example, there is a terminal device for acquiring an elevation value of a current position using a GPS, which includes a GPS signal reception unit that receives a GPS signal and a GPS correction signal correcting the GPS signal from a GPS satellite and a QZS satellite complementing the GPS satellite; a first elevation value calculation unit that calculates the elevation value of the current position from the GPS signal and the GPS correction signal; an atmospheric pressure information detection unit that detects atmospheric pressure information including an ambient atmospheric pressure and an ambient temperature of the terminal device; a second elevation value calculation unit that calculates the elevation value of the current position from the atmospheric pressure information; and a control unit that controls an operation of each unit. Here, when the GPS signal reception unit receives the GPS correction signal, the control unit uses the elevation value calculated by the first elevation value calculation unit as the elevation value of the current position and calibrates the second elevation value calculation unit using the elevation value calculated by the first elevation value calculation unit. When the GPS signal reception unit does not receive the GPS correction signal, the control unit uses the elevation value calculated by the calibrated second elevation value calculation unit as the elevation value of the current position.

The terminal device according to the present invention further includes a storage unit that stores the elevation value calculated by the first elevation value calculation unit and an atmospheric pressure information change detection unit that detects a change in the atmospheric pressure information for a change in the current position. Here, when the GPS signal reception unit receives the GPS correction signal, the control unit stores the elevation value calculated by the first elevation value calculation unit in the storage unit. When the GPS signal reception unit does not receive the GPS correction signal and the change in the atmospheric pressure information detected by the atmospheric pressure information change detection unit is a first threshold value or more, the control unit uses the elevation value stored in the storage unit as the elevation value of the current position and calibrates the second elevation value calculation unit using the elevation value stored in the storage unit, at a position where the change in the atmospheric pressure information is settled to second threshold value or less thereafter.

Advantageous Effects of Invention

According to the present invention, an elevation value can be acquired with high precision in a building or a tunnel.

BRIEF DESCRIPTION OF DRAWINGS

FIG. 5 is a diagram illustrating a relation of an atmospheric pressure and an elevation.

FIG. 6 is a diagram illustrating an example of a display screen of terminal device 1.

DESCRIPTION OF EMBODIMENTS

Hereinafter, embodiments will be described using the drawings.

First Embodiment

Figure 1:
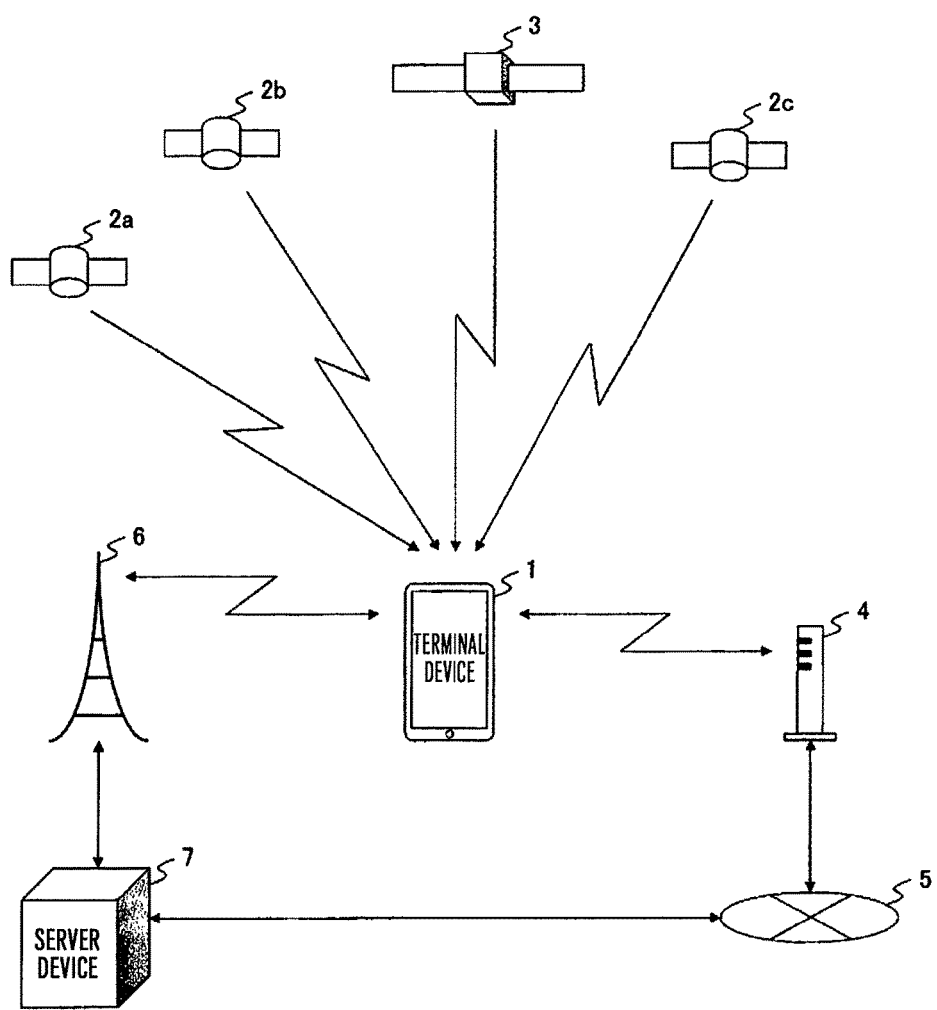
FIG. 1 is a configuration diagram of a position information acquisition system according to a first embodiment.

FIG. 1 is a configuration diagram of a position information acquisition system according to a first embodiment. The position information acquisition system is configured to include terminal device 1, GPS satellite 2, QZS satellite 3, wireless router 4, network 5, base station 6, and server device 7.

A global positioning system (GPS) is a system for measuring a current position on earth and GPS satellite 2 transmits a GPS signal to terminal device 1. A quasi-zenith satellite system (QZSS) is a system for improving position precision in Japan by complementing and reinforcing GPS information and QZS satellite 3 transmits a GPS compatible signal and a GPS correction signal to terminal device 1.

Terminal device 1 receives GPS signals from four GPS satellites 2 (2a to 2d) and calculates position information and an elevation value. Alternatively, the terminal device receives GPS signals (including a GPS compatible signal) from three GPS satellites 2 (2a to 2c) and one QZS satellite 3, receives correction signals for the GPS signals from QZS satellite 3, and calculates position information and an elevation value with high precision. The GPS correction signals are also called reinforcement signals. In addition, terminal device 1 acquires map information from server device 7 via wireless router 4 and network 5. Alternatively, the terminal device acquires the map information from server device 7 via base station 6 from a mobile network operator.

Wireless router 4 includes a wireless local area network (LAN) function such as wireless fidelity (Wi-Fi) and is connected to network 5 via a communication line. Terminal device 1 can obtain information from network 5 via wireless router 4. Wireless router 4 may be an access point of the wireless LAN such as Wi-Fi.

Base station 6 from the mobile network operator is connected to server device 7 by wire or wirelessly and terminal device 1 can obtain information from server device 7. If server device 7 receives position information from terminal device 1 via base station 6 or network 5, server device 7 provides map information of a predetermined scale based on a place shown by the position information to terminal device 1. All necessary map information may be previously provided.

Figure 2:
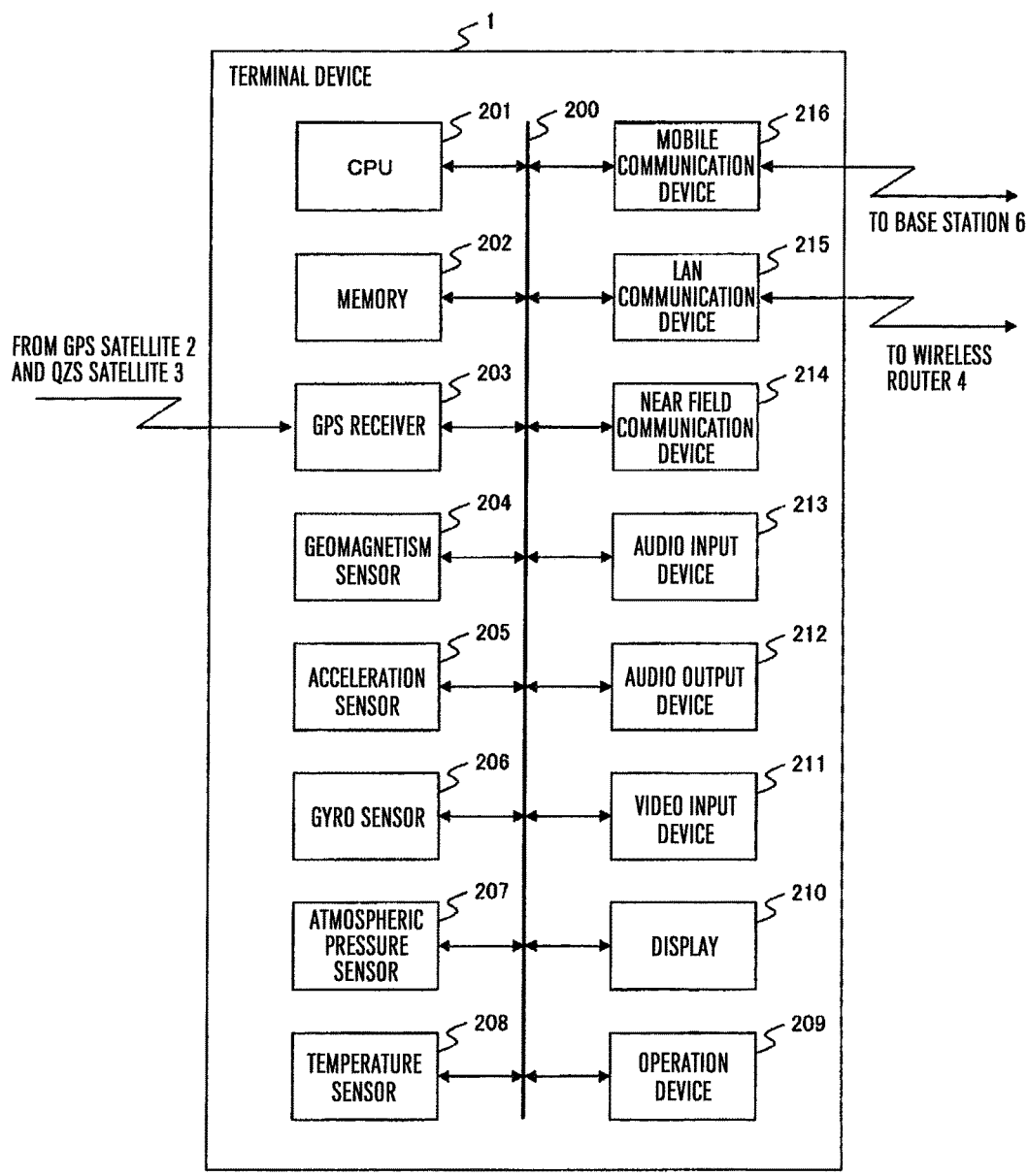
FIG. 2 is a hardware configuration diagram of terminal device 1 of FIG. 1.

FIG. 2 is a hardware configuration diagram of terminal device 1 of FIG. 1. Terminal device 1 is, for example, a mobile phone, a smart phone, a tablet terminal, or a navigation device. Alternatively, the terminal device may be a personal digital assistant (PDA) or a notebook-sized personal computer (PC). The terminal device may be another portable digital apparatus such as a music player, a digital camera, or a portable game machine having a communication function. In addition, the terminal device may be wearable smart watches or smart glasses.

An internal configuration of terminal device 1 will be described. Individual processing units in the device are connected via bus 200. Central processing unit (CPU) 201 may be any control circuit or a dedicated circuit such as an application specific IC (ASIC) and controls each unit of terminal device 1 according to a predetermined program. Memory 202 is configured by using a read only memory (ROM), a random access memory (RAM), a flash ROM, and the like, and stores an application program to control terminal device 1 and map information. CPU 201 realizes various functions by executing the above program.

GPS receiver 203 is a global positioning system (GPS) receiver that includes an antenna and a decoding circuit, receives a radio wave from a satellite, and can calculate position information of terminal device 1 on earth. The correction signal of the GPS satellite is received from the base station and position precision can be improved by a differential GPS (DGPS) to correct GPS information. In addition, the GPS compatible signal and the GPS correction signal are received from an earth orbiting satellite by the quasi-zenith satellite system (QZSS) to complement and reinforce the GPS information and position precision and elevation precision can be further improved. In addition, seamless positioning is enabled outdoor and indoor by an indoor messaging system (IMES) for receiving a signal having compatibility with the GPS satellite from an indoor GPS transmitter and acquiring position information.

Geomagnetism sensor 204, acceleration sensor 205, and gyro sensor 206 are a sensor group to detect the posture or the movement of a casing of terminal device 1 and a variety of information such as a position, a direction, an inclination, and a movement of terminal device 1 are detected by the sensor group.

Atmospheric pressure sensor 207 measures an ambient atmospheric pressure of terminal device 1 and uses a pressure sensor based on micro electro mechanical systems (MEMS). CPU 201 calculates an elevation value of terminal device 1 at a current position, on the basis of the atmospheric pressure detected by atmospheric pressure sensor 207. Temperature sensor 208 measures an ambient temperature of terminal device 1. CPU 201 displays the ambient temperature on display 210, based on the temperature information of temperature sensor 208, corrects temperature dependency of atmospheric pressure sensor 207, and corrects temperature dependency of a relational expression of an atmospheric pressure and an elevation value.

Operation device 209 is, for example, a touch pad, and receives an operation from a user and transmits an instruction based on the operation to CPU 201. Display 210 is, for example, a liquid crystal panel and displays a variety of information. An element obtained by combining the liquid crystal panel and the touch pad is generally called a touch panel and in this embodiment, an example using the touch panel is described. Video input device 211 is, for example a camera, which converts light input from a lens into an electric signal and inputs image data of a surrounding portion or a target material. Audio output device 212 includes, for example an amplifier or a speaker, which outputs a variety of audio. Audio input device 213 is, for example a microphone, which converts voice of the user into audio data and inputs the audio data.

Near field communication device 214 performs near field communication such as near field communication (NFC) and inputs/outputs a variety of data with other near field communication device or an electronic tag in a contactless manner. The electronic tag is also called an IC tag or an NFC tag. The electronic tag is a tag in which an IC chip and an antenna for data transmission/reception are embedded and can read or write data which has been written in the IC chip in a contactless manner. The written data may be a URL of map information, position information, and an elevation value in a building.

LAN communication device 215 obtains, for example, a variety of information from Network 5 via wireless router 4 using Wi-Fi. In addition, LAN communication device 215 can calculate position information using a connection situation with the wireless router in each place. Mobile communication device 216 obtains a variety of information from server device 7 via base station 6 from the mobile network operator. Each of near field communication device 214, LAN communication device 215, and mobile communication device 216 includes an antenna, an encoding circuit, and a decoding circuit.

Figure 3:
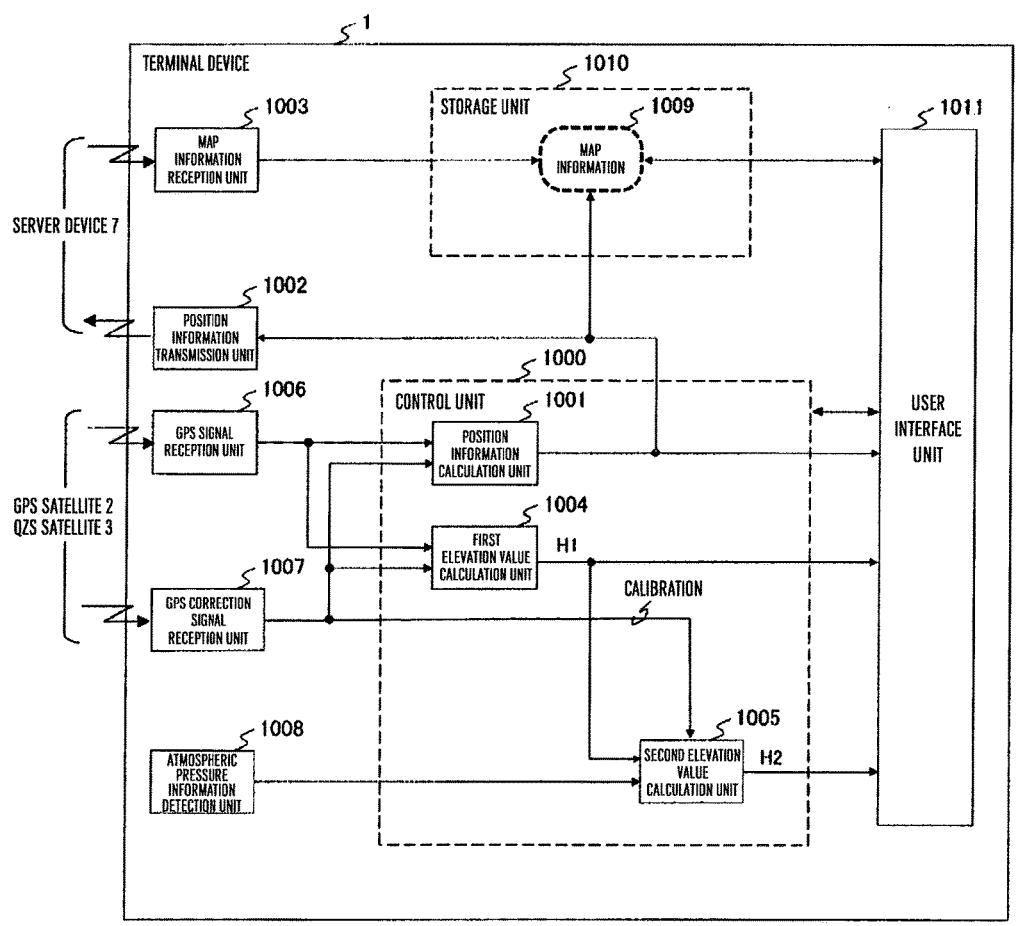
FIG. 3 is a functional block diagram of terminal device 1 according to the first embodiment.

FIG. 3 is a functional block diagram of terminal device 1 according to the first embodiment. Each functional block of terminal device 1 operates on CPU 201 or memory 202 in terminal device 1 illustrated in FIG. 2.

Control unit 1000 includes position information calculation unit 1001, first elevation value calculation unit 1004, and second elevation value calculation unit 1005.

Position information calculation unit 1001 calculates position information from a GPS signal and a GPS complementary signal received by GPS signal reception unit 1006 and corrects the position information with a GPS correction signal received by GPS correction signal reception unit 1007. The corrected position information is transmitted to position information transmission unit 1002. When the GPS correction signal is not obtained, correction is not executed. When the position information is not calculated, the position information is estimated and calculated by acceleration sensor 205 and LAN communication device 215 illustrated in FIG. 2.

First elevation value calculation unit 1004 calculates an elevation value from the GPS signal and the GPS complementary signal received by GPS signal reception unit 1006, corrects the elevation value with the GPS correction signal received by GPS correction signal reception unit 1007 (H1), and transmits the elevation value to second elevation value calculation unit 1005.

Second elevation value calculation unit 1005 calculates an elevation value by atmospheric pressure information detected by atmospheric pressure information detection unit 1008 (H2). At this time, the calculation method executes calibration by the elevation value calculated by first elevation value calculation unit 1004. The calibration is executed only when the GPS correction signal is obtained from GPS correction signal reception unit 1007.

Position information transmission unit 1002 is configured, for example, by using LAN communication device 215 and mobile communication device 216 illustrated in FIG. 2 and transmits the position information calculated by position information calculation unit 1001 to server device 7 via network 5 or base station 6.

Map information reception unit 1003 is configured, for example, by using LAN communication device 215 and mobile communication device 216 illustrated in FIG. 2 and receives map information 1009 from server device 7 via network 5 or base station 6.

GPS signal reception unit 1006 and GPS correction signal reception unit 1007 are configured, for example, by using GPS receiver 203 illustrated in FIG. 2 and receives the GPS signal from GPS satellite 2, receives the GPS complementary signal and the GPS correction signal from QZS satellite 3, and transmits these signals to position information calculation unit 1001 and first elevation value calculation unit 1004.

Atmospheric pressure information detection unit 1008 is configured, for example, by using atmospheric pressure sensor 207 and temperature sensor 208 illustrated in FIG. 2 and measures atmospheric pressure information such as the ambient atmospheric pressure and the ambient temperature of terminal device 1 and transmits the atmospheric pressure information to second elevation value calculation unit 1005.

Storage unit 1010 is configured, for example, by using memory 202 illustrated in FIG. 2 and stores the map information 1009 received by map information reception unit 1003.

User interface unit 1011 is configured, for example, by using operation device 209, display 210, video input device 211, audio output device 212, and audio input device 213 illustrated in FIG. 2. In user interface unit 1011, information such as the map information 1009 stored in storage unit 1010, the position information calculated by position information calculation unit 1001, and the elevation values (H1 and H2) calculated by first elevation value calculation unit 1004 and second elevation value calculation unit 1005 is provided to the user and an instruction from the user is transmitted to control unit 1000.

Figure 4:
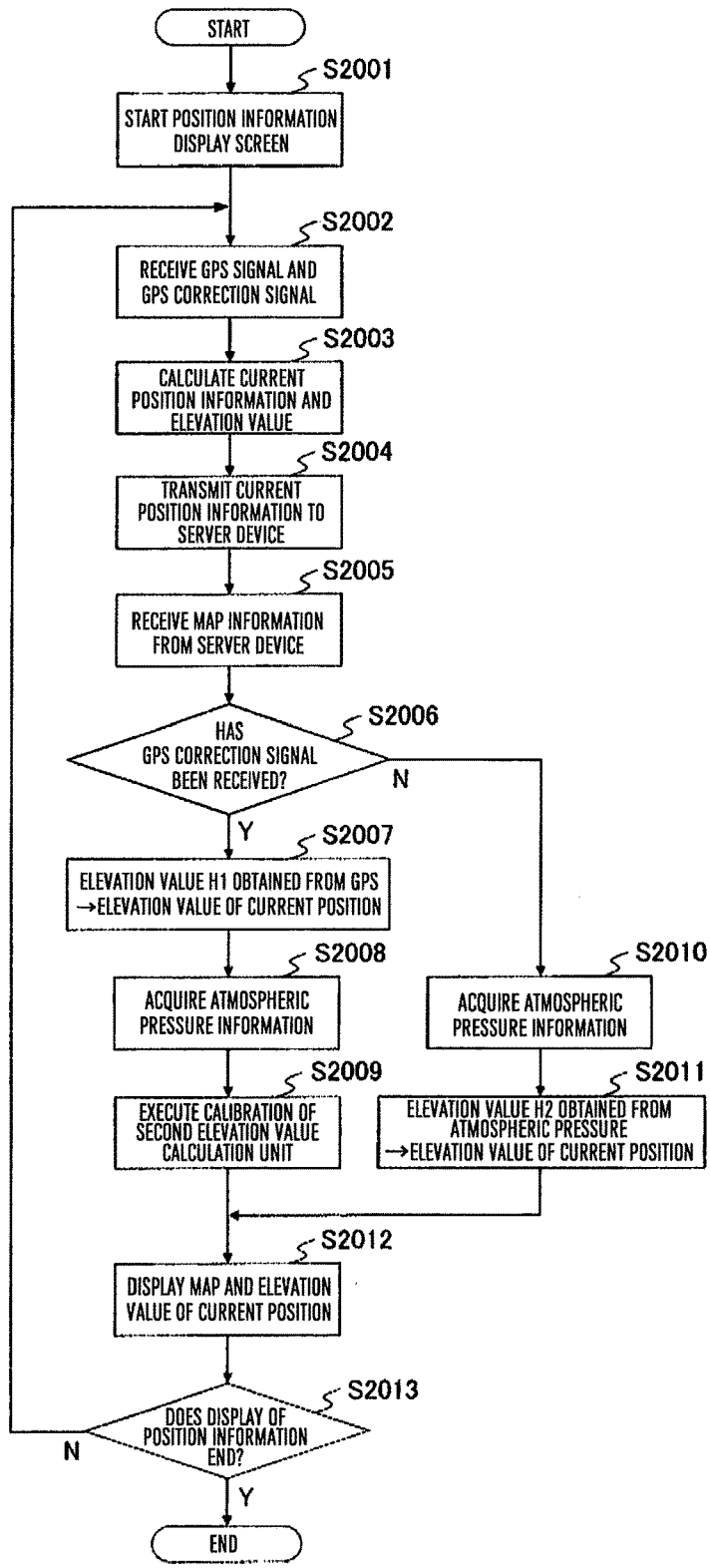
FIG. 4 is an operation sequence diagram illustrating a position information acquisition process in the first embodiment.

FIG. 4 is an operation sequence diagram illustrating a position information acquisition process in the first embodiment.

In step S2001, control unit 1000 of terminal device 1 receives a command of a position information display screen start from user interface unit 1011 and then starts a position information display screen.

In step S2002, GPS signal reception unit 1006 receives the GPS signal and the GPS complementary signal and GPS correction signal reception unit 1007 receives the GPS correction signal.

In step S2003, position information calculation unit 1001 calculates position information from the received GPS signal and GPS complementary signal and corrects the position information with the received GPS correction signal. In addition, first elevation value calculation unit 1004 calculates an elevation value from the received GPS signal and GPS complementary signal and corrects the elevation value with the received GPS correction signal.

For example, if the GPS signals can be received from the four GPS satellites 2a to 2d, the position information or the elevation value can be calculated. However, if the GPS signal, the GPS complementary signal, and the GPS correction signal can be received from the three GPS satellites 2a to 2c and one QZS satellite 3, the position information and the elevation value can be corrected to be high precision position information and an elevation value. When the GPS signal, the GPS complementary signal, and the GPS correction signal from GPS satellite 2 and QZS satellite 3 are insufficient and the position information cannot be calculated, a movement state is detected by acceleration sensor 205 and a current position is estimated and calculated.

In step S2004, position information transmission unit 1002 transmits the current position information calculated by position information calculation unit 1001 to server device 7 via network 5 or base station 6. Server device 7 generates the map information 1009 from a map database, based on the current position information received from terminal device 1.

In step S2005, map information reception unit 1003 receives the map information 1009 generated by server device 7 and stores the map information in storage unit 1010.

In step S2006, it is determined whether the GPS correction signal has been received in step S2002. When the GPS correction signal has been received (YES), the process proceeds to step S2007 and when the GPS correction signal has not been received (NO), the process proceeds to step S2010. In step S2006, the process may start at the same time as step S2004, without awaiting an end of the process of step S2005.

In step S2007 (YES in S2006), elevation value H1 calculated by step S2002 is used as an elevation value of a current position. Elevation value H1 is corrected with the GPS correction signal.

In step S2008, atmospheric pressure information, such as the atmospheric pressure and the temperature, is detected by atmospheric pressure information detection unit 1008.

In step S2009, second elevation value calculation unit 1005 calculates elevation value H2 from the atmospheric pressure information and the calibration of second elevation value calculation unit 1005 is executed such that calculated elevation value H2 becomes elevation value H1 of the current position.

In step S2010 (NO in S2006), the atmospheric pressure information such as the atmospheric pressure and the temperature is detected by atmospheric pressure information detection unit 1008.

In step S2011, elevation value H2 is calculated from the atmospheric pressure information by second elevation value calculation unit 1005 and is used as the elevation value of the current position. Here, second elevation value calculation unit 1005 is calibrated by step S2009, when the GPS correction signal is received.

After step S2009 or step S2011, in step S2012, control unit 1000 displays the map information and the elevation value of the current position on user interface unit 1011.

In step S2013, the process ends when user interface unit 1011 receives a command of a display end of the position information and the process returns to step S2002 and the process continues when the command of the end is not received. By repeating steps S2002 to S2013, display information of terminal device 1 is updated.

Terminal device 1 may previously acquire the map information 1009. In this case, the processes of steps S2004 and S2005 are unnecessary. In addition, map information wider than a range displayed on terminal device 1 may be acquired and the processes of steps S2004 and S2005 may be executed only when the processes are necessary.

As such, in this embodiment, the GPS signal, the GPS complementary signal, and the GPS correction signal are received from the GPS satellite and the QZS satellite and elevation value H1 is calculated by first elevation value calculation unit 1004 (there is correction by the GPS correction signal). In addition, second elevation value calculation unit 1005 executes calibration of elevation value H2 calculated from the atmospheric pressure information, using elevation value H1. As a result, even when the elevation value cannot be acquired from the GPS satellite or the QZS satellite in a structure such as a tunnel and a building, a high-precision elevation value can be calculated from the atmospheric pressure information.

Next, a method of calculating an elevation value from atmospheric pressure information in second elevation value calculation unit 1005 will be described.

FIG. 5 is a diagram illustrating a relation of an atmospheric pressure and an elevation value. (a) illustrates the case in which an atmospheric pressure range is wide, (b) illustrates the case of a practical atmospheric pressure range, and (c) illustrates a calibration method.

An elevation value H in relation to an atmospheric pressure P is generally acquired by the following equation (1).

$$H=504.6*(t_0+273.2)*(1-(P/P_0)^{\wedge}0.1902) \qquad (1)$$

Here, $P_0$[hPa] and $t_0$[° C.] show an atmospheric pressure and an atmospheric temperature in an elevation H=0 [ft], respectively. (a) illustrates a characteristic when $P_0$=1013.25 and $t_0$=15 are set. When the atmospheric pressure P changes from 500 hPa to 1150 hPa, the elevation H changes from about 18000 ft to about −4000 ft and is represented non-linearly.

In (b), because a characteristic of a change range 950 to 1050 hPa (practical range) of an atmospheric pressure in the everyday life is enlarged, an elevation is represented by an approximately straight line. The elevation for the atmospheric pressure may be calculated by the above equation (1). However, a data table for conversion between the atmospheric pressure and the elevation may be prepared and the elevation may be acquired by referring to the data table. In the case of the data table, an elevation for any atmospheric pressure can be acquired by linear approximation interpolation in a range considered to be a linear shape.

As such, the elevation value H can be acquired from the atmospheric pressure P of the current position. However, as represented by the equation (1), the elevation value also depends on the atmospheric pressure $P_0$ and the temperature $t_0$ in the elevation H=0. However, because these parameters change according to a time or a place, it is necessary to execute the calibration to acquire the elevation value accurately.

(c) is a diagram illustrating the calibration method. Correction is executed by applying an offset value ΔH of the elevation value to the characteristic of (b) in a longitudinal axis direction. The offset value ΔH (=H1−H2) is previously acquired from a difference of elevation value H1 calculated/corrected from the GPS signal, the GPS complementary signal, and the GPS correction signal in first elevation value calculation unit 1004 and elevation value H2 calculated from the atmospheric pressure information in second elevation value calculation unit 1005. Here, precision of elevation value H1 calculated/corrected from the GPS signal (including GPS correction signal) is higher than precision of elevation value H2 calculated from the atmospheric pressure information. Therefore, when elevation value H1 is not obtained from the GPS signal, the elevation value calculated from the atmospheric pressure information is corrected by using the offset value ΔH acquired right before. That is, an elevation value H' after correcting the elevation value H calculated from the atmospheric pressure information is represented by the following equation (2).

$$H' = H + \Delta H \tag{2}$$

When the calibration is executed by the equation (1), an offset value ΔP from an elevation value 1013.25 [hPa] may be applied as a value of $P_0$.

Next, an example of a display screen when terminal device 1 receives an operation from the user and displays position information will be described.

FIG. 6 illustrates an example of the display screen of terminal device 1. (a) illustrates a home screen (or a menu screen) and (b) and (c) illustrate display examples of the position information.

In home screen 600 of (a), a "position information" icon 610 among icons of various applications displayed on a touch panel is displayed. When contacting icon 610, position information display screen 601 illustrated in (b) is displayed on user interface unit 1011 by the operation sequence illustrated in FIG. 4. Position information display screen 601 is configured, for example, by using a map, a current position 602 of the user, and a guide display 603. If a home button 606 is pressed, position information display screen 601 is closed and display returns to home screen 600 of (a).

In screen 601 of (b), current position 602 of the user shows that the user is on a ground road in front of an elevated construction and an elevation value of current position 602 is displayed on guide display 603. In addition, QZS satellite icon 604 is displayed on guide display 603 and shows a state in which a signal can be received from a QZS satellite. Current position 602 is a position on a general road, the GPS signal, the GPS complementary signal, and the GPS correction signal are received from the GPS satellite and the QZS satellite, and the position information and the elevation value are calculated. At this time, the calibration of second elevation value calculation unit 1005 is executed by the calculated elevation value.

Screen 601 of (c) shows an example of the case in which current position 602 of the user moves to a position under the elevated construction and in this state, an overhead space is shielded by a structure such as the elevated construction and signals cannot be received from the GPS satellite and the QZS satellite. In this case, the elevation value is calculated by second elevation value calculation unit 1005 on the basis of the atmospheric pressure information measured by atmospheric pressure information detection unit 1008 and is displayed on guide display 603. Second elevation value calculation unit 1005 can display a high-precision elevation value in state of (b) in which the calibration is executed using the elevation value calculated in when the GPS correction signal is received from the QZS satellite. In addition, because the QZS satellite icon is not displayed on guide display 603, it can be known that a current state is a state in which a signal cannot be received from the QZS satellite, that is, a current position is a position under the elevated construction, not on the elevated construction. In this case, "under the elevated construction" may be displayed on guide display 603.

In addition, an elevation value of the road on the ground and the elevated construction may be added to map data, so that it may be displayed whether the user is on the ground or is on the elevated construction, based on the elevation value.

According to the first embodiment, terminal device 1 executes the calibration of second elevation value calculation unit 1005 by the elevation value calculated when the GPS correction signal is received from QZS satellite 3. In addition, when the GPS signal (including the GPS correction signal) cannot be received, the elevation value is calculated from the atmospheric pressure information measured by atmospheric pressure information detection unit 1008, by second elevation value calculation unit 1005 after calibration. As a result, a high-precision elevation value can be obtained even when the GPS signal (including the GPS correction signal) cannot be received in the building or in the tunnel.

Second Embodiment

In a second embodiment, a function of cancelling an atmospheric pressure difference or a temperature difference inside or outside a structure such as a building and a tunnel is added to the first embodiment. For example, in the building and the tunnel, atmospheric pressures or temperatures differ indoor and outdoor, and the atmospheric pressure changes greatly in the vicinity of an entrance. When entering a building with doors or air curtains in particular, a large atmospheric pressure change or temperature change occurs. Here, the atmospheric pressure change means a change in atmospheric pressure information at each position when moving from an external side to an internal side of the building or the tunnel, not a temporal change in an atmospheric pressure at a fixed position. For this reason, even though calibration of an elevation value is executed outside the building or the tunnel, an accurate elevation value may not be calculated inside. Therefore, when the change in the atmospheric pressure information is a predetermined value or more, the calibration is executed again using the elevation value outside the building or the tunnel, at a position where the change is settled.

Figure 7:
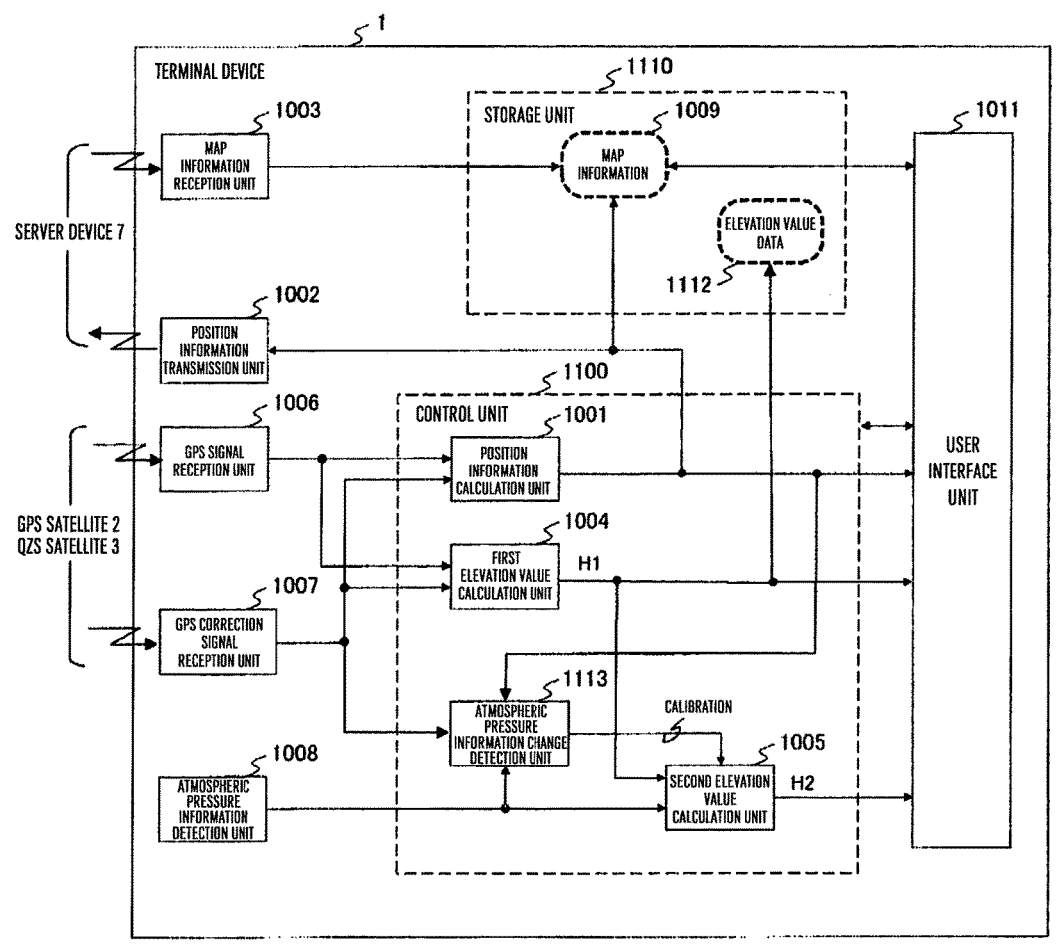
FIG. 7 is a functional block diagram of terminal device 1 according to a second embodiment.

FIG. 7 is a functional block diagram of terminal device 1 according to the second embodiment. The same functional blocks as those in the first embodiment (FIG. 3) are denoted with the same reference numerals and overlapped description is omitted.

Control unit 1100 includes atmospheric pressure information change detection unit 1113, in addition to position information calculation unit 1001, first elevation value calculation unit 1004, and second elevation value calculation unit 1005.

First elevation value calculation unit 1004 calculates an elevation value from a GPS signal and a GPS complementary signal received by GPS signal reception unit 1006, corrects the elevation value with a GPS correction signal received by GPS correction signal reception unit 1007 (H1), and transmits the elevation value to second elevation value calculation unit 1005 and storage unit 1110. Map information 1009 and elevation value data 1112 transmitted from first elevation value calculation unit 1004 are stored in storage unit 1110.

Second elevation value calculation unit 1005 calculates an elevation value by atmospheric pressure information detected by atmospheric pressure information detection unit 1008 (H2). At this time, a calculation method executes calibration using the elevation value calculated by first elevation value calculation unit 1004 (first calibration). The first calibration is executed when the GPS correction signal is obtained from GPS correction signal reception unit 1007.

Second elevation value calculation unit 1005 executes the calibration using elevation value data 1112 stored in storage unit 1110 (second calibration). The second calibration is executed at a position where the GPS correction signal is not obtained from GPS correction signal reception unit 1007 and atmospheric pressure information change detection unit 1113 detects atmospheric pressure change ΔP of first threshold value ΔP1 or more and then atmospheric pressure change is settled to second threshold value ΔP2 or less.

When the GPS correction signal is not received, atmospheric pressure information change detection unit 1113 compares atmospheric pressures for every predetermined distance movement, using the atmospheric pressure information detected by atmospheric pressure information detection unit 1008 and the position information calculated by position information calculation unit 1001. In addition, an instruction of the second calibration is input to second elevation value calculation unit 1005, at a position where the detected atmospheric pressure change ΔP is the predetermined first threshold value ΔP1 or more and then atmospheric pressure change is settled to second threshold value ΔP2 or less. Second threshold value ΔP2 is set smaller than first threshold value ΔP1. However, both the first and second threshold values may be used as the same values.

In user interface unit 1011, elevation value data 1112 stored in storage unit 1010 as well as the elevation values (H1 and H2) calculated by first elevation value calculation unit 1004 and second elevation value calculation unit 1005 are displayed as information of an elevation value of a current position.

Figure 8:
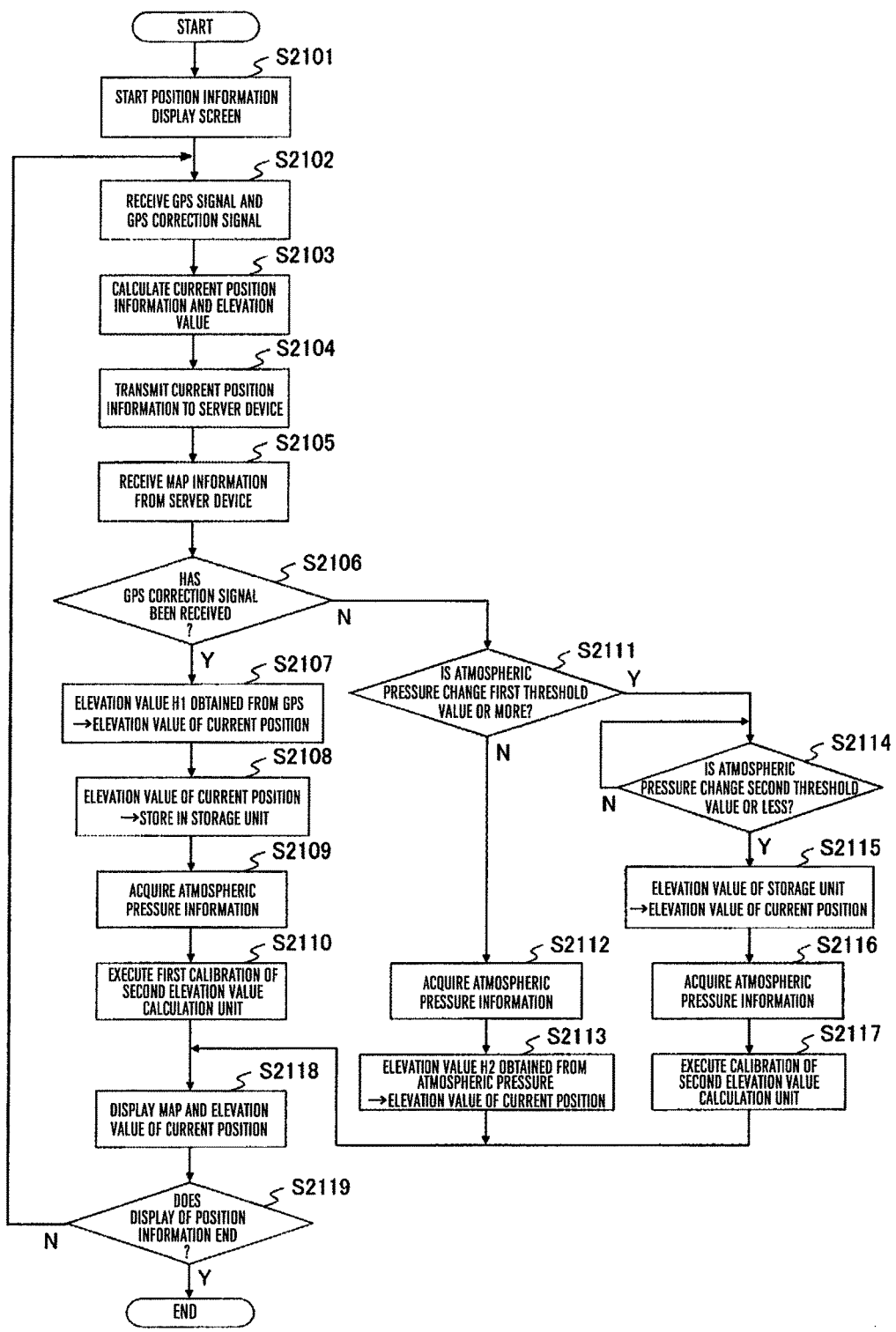
FIG. 8 is an operation sequence diagram illustrating a position information acquisition process in the second embodiment.

FIG. 8 is an operation sequence diagram illustrating a position information acquisition process in the second embodiment.

Processes of steps S2101 to S2105 are the same as those of steps S2001 to S2005 of the first embodiment (FIG. 4).

In step S2106, it is determined whether the GPS correction signal has been received in step S2102. When the GPS correction signal is received (YES), the process proceeds to step S2107 and when the GPS correction signal is not received (NO), the process proceeds to step S2111.

In step S2107 (YES in S2106), elevation value H1 calculated by step S2102 is used as an elevation value of a current position. In step S2108, the elevation value of the current position is stored as elevation value data 1112 in storage unit 1110.

In step S2109, the atmospheric pressure information such as the atmospheric pressure and the temperature is detected by atmospheric pressure information detection unit 1008. In step S2110, second elevation value calculation unit 1005 calculates elevation value H2 from the atmospheric pressure information and executes the calibration (first calibration) of second elevation value calculation unit 1005, such that calculated elevation value H2 becomes elevation value H1 of the current position.

In step S2111 (NO in S2106), it is determined by atmospheric pressure information change detection unit 1113 whether atmospheric pressure change ΔP for every predetermined distance movement is the predetermined first threshold value ΔP1 or more. When the atmospheric pressure change is not ΔP1 or more (NO), the process proceeds to step S2112 and when the atmospheric pressure change is ΔP1 or more (YES), the process proceeds to step S2114.

In step S2112 (NO in S2111), the atmospheric pressure information such as the atmospheric pressure and the temperature is detected by atmospheric pressure information detection unit 1008. In step S2113, second elevation value calculation unit 1005 calculates elevation value H2 from the atmospheric pressure information and sets the elevation value as the elevation value of the current position. Here, the first calibration of second elevation value calculation unit 1005 is executed in step S2110, when the GPS correction signal is received.

In step S2114 (YES in S2111), a user moves to the position where atmospheric pressure change ΔP is settled to second threshold value ΔP2 or less. If the change is settled, the process proceeds to step S2115 and elevation value data 1112 stored in storage unit 1110 is used as the elevation value of the current position.

In step S2116, atmospheric pressure information detection unit 1008 detects the atmospheric pressure information such as the atmospheric pressure and the temperature. In step S2117, second elevation value calculation unit 1005 calculates elevation value H2 from the atmospheric pressure information and executes the second calibration of second elevation value calculation unit 1005, such that calculated elevation value H2 becomes the elevation value (elevation value set by step S2115) of the current position.

After step S2110, step S2113, or step S2117, in step S2118, the map information and the elevation value of the current position are displayed on user interface unit 1011. In step S2119, when a command of a display end of the position information is received, the process ends and when the command of the end is not received, the process returns to step S2102 and the process continues.

Here, a process when it is determined in step S2111 that atmospheric pressure change ΔP is first threshold value ΔP1 or more will be described.

Figure 9:
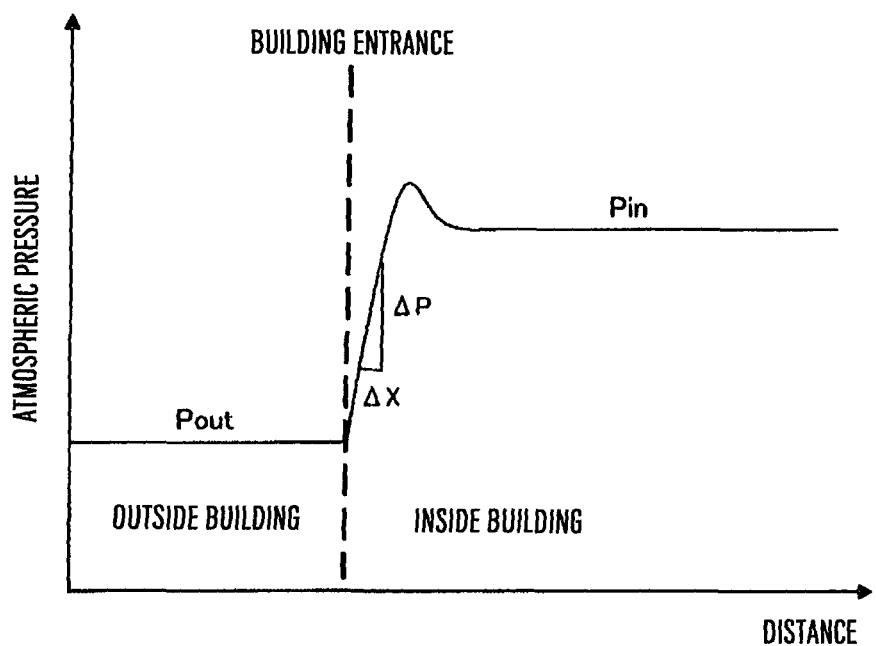
FIG. 9 is a diagram illustrating an example of a relation of an atmospheric pressure and a distance in the vicinity of a building entrance.

FIG. 9 is a diagram illustrating an example of a relation of an atmospheric pressure and a distance in the vicinity of a building entrance. An atmospheric pressure is constant (Pout) outside a building, but there is a rapid atmospheric pressure change in the vicinity of the building entrance. When entering the building, the atmospheric pressure becomes stable again (Pin). At this time, the atmospheric pressures may be different outside and inside the building (Pout≠Pin). Therefore, atmospheric pressure change ΔP is detected by atmospheric pressure information change detection unit 1113. Atmospheric pressure change ΔP is a change amount of an atmospheric pressure for every movement of a predetermined distance ΔX and is compared with first threshold value ΔP1 and second threshold value ΔP2 (ΔP1≥ΔP2).

When atmospheric pressure change ΔP is second threshold value ΔP2 or more, the calibration (second calibration) of second elevation value calculation unit 1005 is not executed and the calibration of second elevation value calculation unit 1005 is executed again at a position where the atmospheric pressure change is settled to second threshold value ΔP2 or less and the atmospheric pressure is stable. At this time, elevation value data 1112 acquired outside the building and stored in storage unit 1110 is used as the elevation value of the current position.

Instead of the atmospheric pressure change, a temperature change between inside and outside the building or the tunnel may be detected and the calibration may be executed when the temperature change is a threshold value or more. In addition, when the change in the atmospheric pressure information is not detected and an entrance of the building or the tunnel is detected by shape data of the building or the tunnel included in the map data, the calibration may be executed inside the building or the tunnel such that the elevation value becomes the elevation value outside the building or the tunnel. The GPS signal is not received frequently inside the building or the tunnel. In this case, a movement state is detected by acceleration sensor 205 and the current position is estimated.

Figure 10:
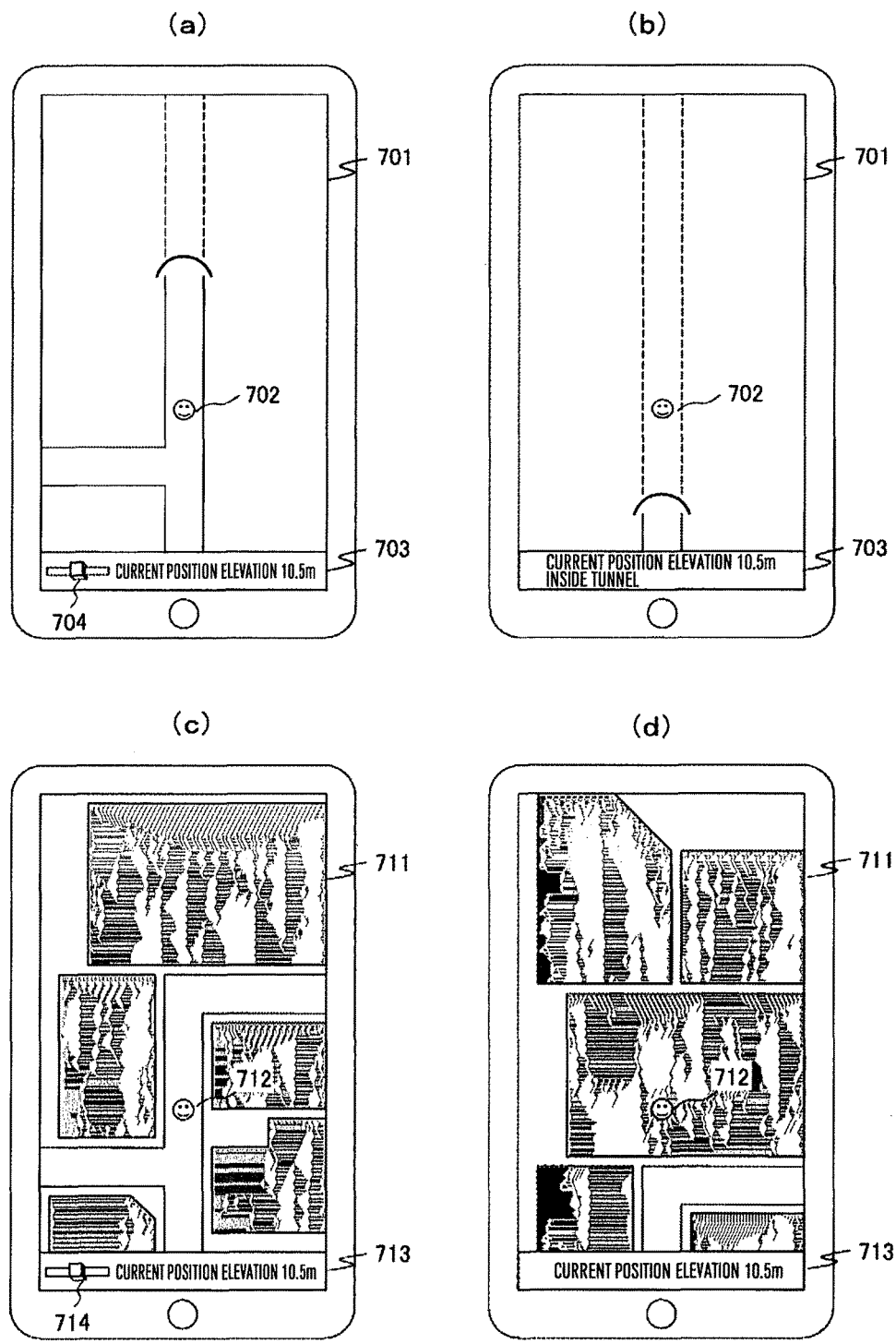
FIG. 10 is a diagram illustrating an example of a display screen of terminal device 1.

FIG. 10 illustrates an example of the display screen of terminal device 1. (a) and (b) illustrate display examples of position information outside and inside the tunnel, respectively, and (c) and (d) illustrate display examples of position information outside and inside the building, respectively.

Position information display screen 701 of (a) shows that current position 702 of the user is on a road in front of the tunnel and an elevation value of current position 702 is displayed on guide display 703. In addition, QZS satellite icon 704 is displayed on guide display 703 and shows a state in which a signal is received from the QZS satellite. Current position 702 is on the road in front of the tunnel and the GPS signal, the GPS complementary signal, and the GPS correction signal are received from the GPS satellite and the QZS satellite and then the position information and the elevation value are calculated. In addition, the calculated elevation value is stored in storage unit 1110.

Screen 701 of (b) illustrates an example of the case in which the user moves in the tunnel and in this state, signals are not received from the GPS satellite and the QZS satellite. When the atmospheric pressure change is generated at the tunnel entrance, the elevation value stored in storage unit 1110 is read and displayed, at a position where the atmospheric pressure change is settled. In addition, the calibration of second elevation value calculation unit 1005 is executed by using the read elevation value and the current atmospheric pressure information. Then, the elevation value is acquired from the atmospheric pressure information by second elevation value calculation unit 1005 and is displayed. Because the calibration of second elevation value calculation unit 1005 is executed using the elevation value calculated when the GPS correction signal is received, a high-precision elevation value can be displayed. In addition, because the QZS satellite icon is not displayed on guide display 703, it can be known that a current state is a state in which a signal cannot be received from the QZS satellite, that is, the user is inside the tunnel. In this case, "inside the tunnel" may be displayed on guide display 703. In addition, when the road is inclined, an inclination of the road is measured before the user moves in the tunnel. If the elevation value inside the tunnel is corrected with the inclination, more accurate display or calibration can be executed.

Position information display screen 711 of (c) shows that current position 712 of the user is on a road outside the building and QZS satellite icon 714 is displayed. The GPS signal, the GPS complementary signal, and the GPS correction signal are received and the position information and the elevation value are calculated and are displayed on guide display 713. In addition, the calculated elevation value is stored in storage unit 1110.

Screen 711 of (d) illustrates an example of the case in which the user moves to the inside of the building and in this state, signals are not received from the GPS satellite and the QZS satellite. When the atmospheric pressure change is occurred at the building entrance, the elevation value stored in storage unit 1110 is read and is displayed at a position where the atmospheric pressure change is settled. In addition, the calibration of second elevation value calculation unit 1005 is executed using the read elevation value and the current atmospheric pressure information (the atmospheric pressure and the temperature). Then, the elevation value is acquired from the atmospheric pressure information by second elevation value calculation unit 1005 and is displayed. Because the calibration of second elevation value calculation unit 1005 is executed using the elevation value calculated when the GPS correction signal is received, a high-precision elevation value can be displayed. In addition, even though there is the atmospheric pressure difference or the temperature difference inside and outside the building, accurate display and calibration can be executed.

Figure 11:
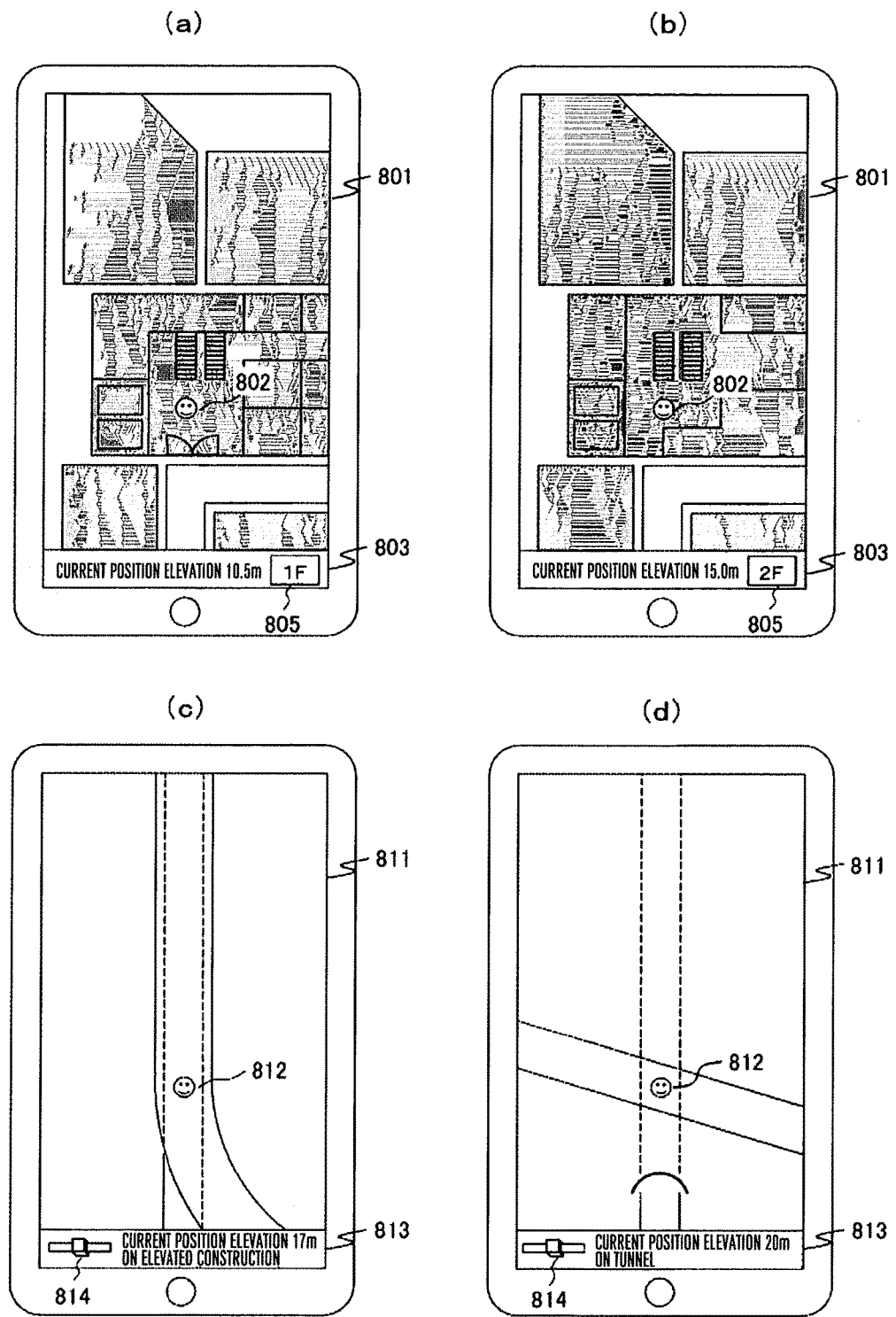
FIG. 11 is a diagram illustrating another example of the display screen of terminal device 1.

FIG. 11 illustrates another example of the display screen of terminal device 1. (a) and (b) illustrate display examples of position information inside the building, (c) illustrates a display example of position information on a road on an elevated construction, and (d) illustrates a display example of position information on a road on the tunnel.

Position information display screen 801 of (a) shows an example of the case in which map information of 1F in the building is added to previous FIG. 10(d). In addition to the elevation value at current position 802 of the user, a floor number 805 is displayed on guide display 803. An elevation value of each floor in the building is acquired from server device 7, it is determined what floor of the building corresponds to an elevation value of a current position, and "1F" can be displayed on the floor number 805.

Screen 801 of (b) illustrates an example of the case in which map information of 2F in the building is added to previous FIG. 10(d). In addition to the elevation value at the current position 802 of the user, "2F" is displayed on the floor number 805 in guide display 803. When the user moves to 2F in the building or moves to a place where there is a temperature difference, the floor number can be displayed by calculating the elevation value from the atmospheric pressure information.

Meanwhile, in a place where there are a plurality of height positions at the same horizontal positions with respect to a structure, like the floor number of the building, the road on the elevated construction and the road under the elevated construction, or the road in the tunnel and the road on the tunnel, height information including the elevation value can be used best.

For example, position information display screen 811 of FIG. 11(c) shows an example of the case in which current position 812 of the user is on the road on the elevated construction. In addition to QZS satellite icon 814 and an elevation value of current position 812, "on the elevated construction" is displayed on guide display 813. FIG. 6(c) illustrates the case in which the user is under the elevated construction at the same horizontal position.

In addition, screen 811 of (d) illustrates an example of the case in which the user is on the road on the tunnel. In addition to QZS satellite icon 814 and an elevation value of current position 812, "on the tunnel" is displayed on guide display 813.

By the above configuration, the same effect as the first embodiment can be obtained in the second embodiment. In the second embodiment, even when the atmospheric pressure or the temperature is different inside and outside the building and the tunnel, a high-precision elevation value can be obtained by cancelling the atmospheric pressure difference or the temperature difference and executing the calibration in a stable state at all times.

Third Embodiment

In a third embodiment, a function of using an indoor messaging system IMES for receiving a signal having compatibility with a GPS satellite from an indoor GPS transmitter and acquiring position information is added to the first embodiment. For example, an IMES transmission device is disposed in a building and position information and an elevation value are transmitted so that the position information and the elevation value can be acquired in the building. As a result, a second elevation value calculation unit can be calibrated.

Figure 12:
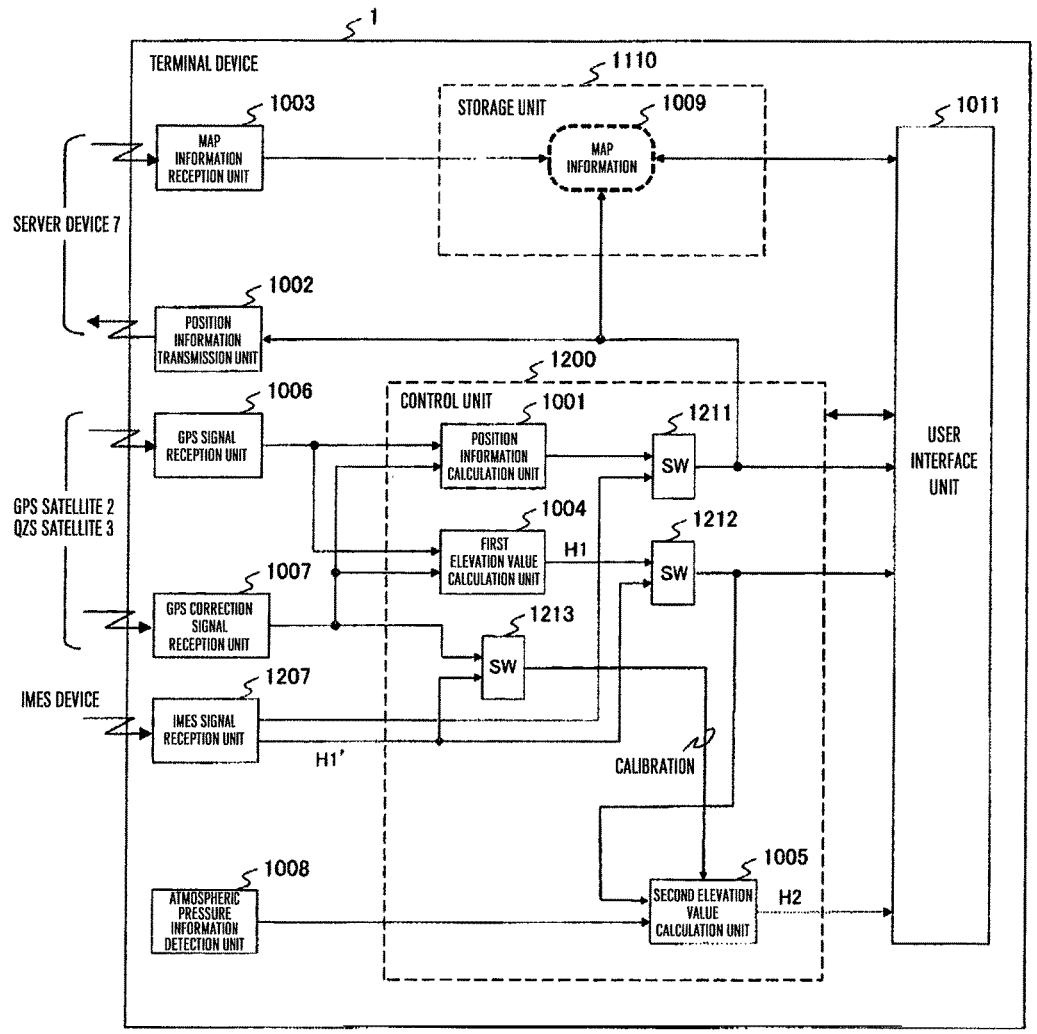
FIG. 12 is a functional block diagram of terminal device 1 according to a third embodiment.

FIG. 12 is a functional block diagram of terminal device 1 according to the third embodiment. The same functional blocks as those in the first embodiment (FIG. 3) are denoted with the same reference numerals and overlapped description is omitted.

Newly added IMES signal reception unit 1207 is configured, for example, by using GPS receiver 203 illustrated in FIG. 2, and receives an IMES signal from the IMES transmission device and acquires the position information and the elevation value. At this time, because the position information and the elevation value are included in the received IMES signal, it is not necessary to calculate the position information and the elevation value by position information calculation unit 1001 or first elevation value calculation unit 1004 in control unit 1200. In addition, map information 1009 is acquired from server device 7 using the acquired position information. In addition, second elevation value calculation unit 1005 is calibrated using an elevation value (H1') acquired from the IMES signal.

Second elevation value calculation unit 1005 switches a process according to whether there is a GPS correction signal from GPS correction signal reception unit 1007 or there is the IMES signal from IMES signal reception unit 1207. When there is the GPS correction signal or the elevation value is acquired from the IMES signal, the calibration is executed.

Each of SW circuits 1211, 1212, and 1213 in control unit 1200 switches an input to the side of IMES signal reception unit 1207 only when the IMES signal is received and the position information or the elevation value acquired from the IMES signal is used, instead of the position information or the elevation value calculated from the GPS signal (including a GPS correction signal). When the IMES signal is not received, the input is switched to the side of the GPS signal and the GPS correction signal and the same operation as the first embodiment (FIG. 3) is executed.

Figure 13:
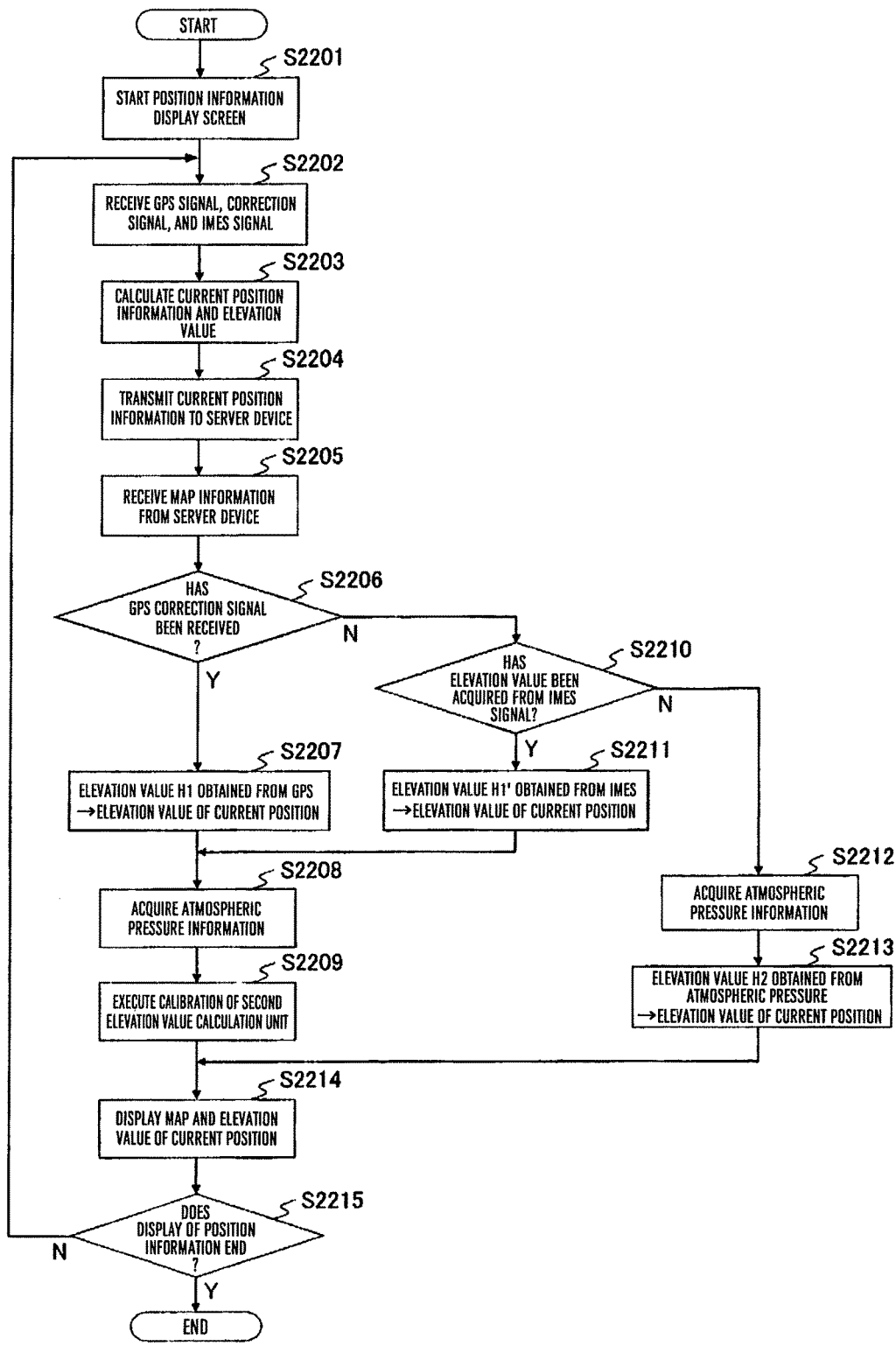
FIG. 13 is an operation sequence diagram illustrating a position information acquisition process in the third embodiment.

FIG. 13 is an operation sequence diagram illustrating a position information acquisition process in the third embodiment.

Processes of steps S2201 to S2205 are the same as those of steps S2001 to S2005 of the first embodiment (FIG. 4). However, in step S2202, the IMES signal is received from IMES signal reception unit 1207 in addition to the GPS signal, the GPS complementary signal, and the GPS correction signal, and in step S2203, the position information and the elevation value are calculated or acquired from the signals including the IMES signal.

In step S2206, the process is switched according to whether the GPS correction signal has been received in step S2202.

When the GPS correction signal is received (S2206: YES), the process proceeds to step S2207 and elevation value H1 calculated in step S2202 is used as an elevation value of a current position.

In step S2208, atmospheric pressure information such as an atmospheric pressure and a temperature is detected by atmospheric pressure information detection unit 1008. In step S2209, the calibration of second elevation value calculation unit 1005 is executed such that elevation value H2 calculated from the atmospheric pressure information becomes the elevation value of the current position.

When the GPS correction signal is not received (S2206: NO), the process proceeds to step S2210 and it is determined whether the IMES signal has been received and the elevation value has been acquired. When the IMES signal is received and the elevation value is acquired, the process proceeds to step S2211, elevation value H1' obtained from the IMES signal is used as the elevation value of the current position, and the process proceeds to step S2208.

When the IMES signal is not received or the elevation value is not acquired (S2210: NO), the process proceeds to step S2212 and the atmospheric pressure information such as the atmospheric pressure and the temperature is detected by atmospheric pressure information detection unit 1008. In step S2213, second elevation value calculation unit 1005 calculates elevation value H2 from the detected atmospheric pressure information and uses the elevation value as the elevation value of the current position.

After step S2209 or step S2213, in step S2114, the map information and the elevation value of the current position are displayed on user interface unit 1011. In step S2215, when a command of a display end of the position information is received, the process ends and when the command of the end is not received, the process returns to step S2202 and the process continues.

By the above configuration, the same effect as the first embodiment can be obtained in the third embodiment. In addition, in the third embodiment, the IMES signal is received in addition to the GPS signal, the elevation value is calculated/acquired, and the calibration of the second elevation value calculation unit is executed by using the acquired elevation value. As a result, even when the GPS signal is not received, the GPS signal is supplemented with the IMES signal and a high-precision elevation value can be obtained seamlessly.

Fourth Embodiment

A fourth embodiment has a configuration in which the atmospheric pressure difference cancellation function according to the second embodiment and the IMES signal reception function according to the third embodiment are combined.

Figure 14:
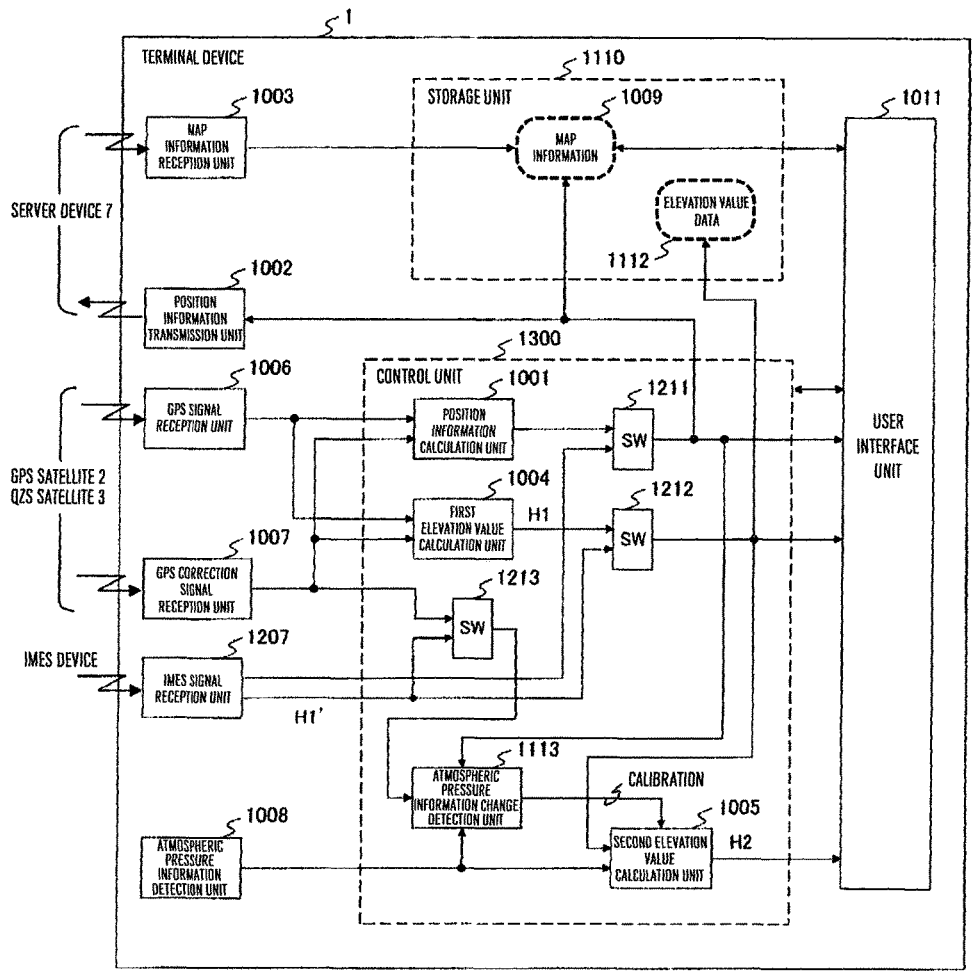
FIG. 14 is a functional block diagram of terminal device 1 according to a fourth embodiment.

FIG. 14 is a functional block diagram of terminal device 1 according to the fourth embodiment. The same functional blocks as those in the second embodiment (FIG. 7) and the third embodiment (FIG. 12) are denoted with the same reference numerals and overlapped description is omitted.

In control unit 1300, an IMES signal from IMES signal reception unit 1207 is input and position information and an elevation value (H1') are acquired. Meanwhile, position information and the elevation value (H1') are calculated using a GPS signal (including a GPS correction signal) and an input is switched by SW circuits 1211, 1212, and 1213. The acquired elevation values (H1 and H1') are stored as elevation value data 1112 in storage unit 1110. In second elevation value calculation unit 1005, first calibration is executed by using the acquired elevation values (H1 and H1').

In addition, atmospheric pressure information change detection unit 1113 is provided in control unit 1300 and acquires a change in the atmospheric pressure information detected by atmospheric pressure information detection unit 1008. When atmospheric pressure change $\Delta P$ is first threshold value $\Delta P1$ or more, second calibration is executed with respect to second elevation value calculation unit 1005, using elevation value data 1112 stored in storage unit 1110, after atmospheric pressure change $\Delta P$ is settled to second threshold value $\Delta P2$ or less.

Figure 15:
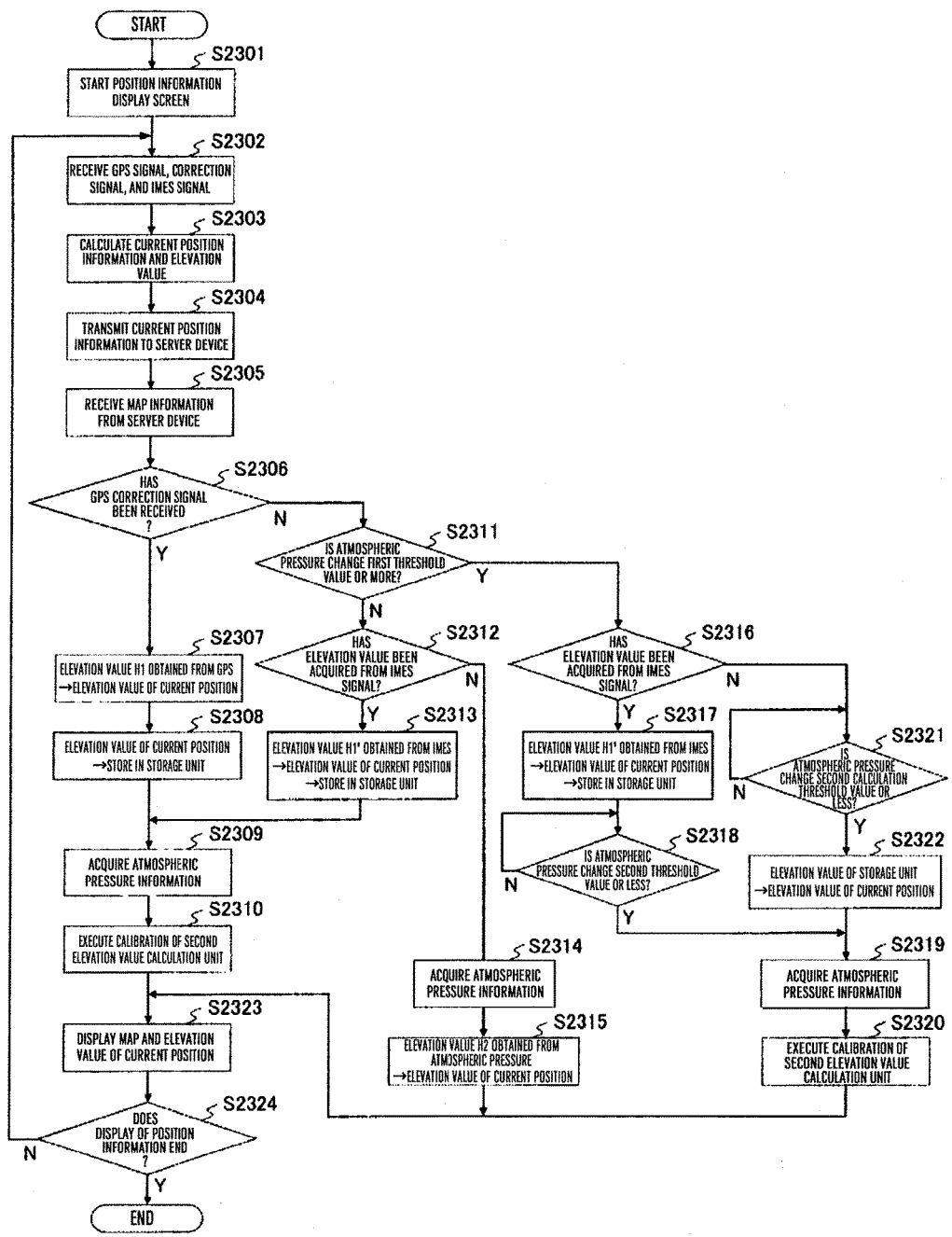
FIG. 15 is an operation sequence diagram illustrating a position information acquisition process in the fourth embodiment.

FIG. 15 is an operation sequence diagram illustrating a position information acquisition process in the fourth embodiment. This sequence is obtained by combining the second embodiment (FIG. 8) and the third embodiment (FIG. 13).

Processes of steps S2301 to S2305 are the same as those of steps S2201 to S2205 of FIG. 13. An IMES signal is received in addition to a GPS signal, a GPS complementary signal, and a GPS correction signal, and position information and an elevation value are calculated or acquired.

When the GPS correction signal is received (S2306: YES), steps S2307 to S2310 are executed which correspond to steps S2107 to S2110 of FIG. 8. That is, elevation value H1 calculated from the GPS signal (including the correction signal) is used as an elevation value of a current position and is stored as elevation value data 1112 in storage unit 1110. In addition, atmospheric pressure information is detected and calibration of second elevation value calculation unit 1005 is executed such that an elevation value calculated from the atmospheric pressure information becomes the elevation value of the current position.

When the GPS correction signal is not received (S2306: NO), the process proceeds to step S2311 and atmospheric pressure change ΔP is detected by atmospheric pressure information change detection unit 1113 and is compared with first threshold value ΔP1. When atmospheric pressure change ΔP is not first threshold value ΔP1 or more (S2311: NO), the process proceeds to step S2312 and it is determined whether the IMES signal has been received and the elevation value has been acquired. When the elevation value is acquired from the IMES signal, the process proceeds to step S2313 and elevation value H1' obtained from the IMES signal is used as the elevation value of the current position and is stored as elevation value data 1112 in storage unit 1110. Further, the process proceeds to step S2309.

When the elevation value is not acquired from the IMES signal (S2312: NO), steps S2314 and S2315 are executed and second elevation value calculation unit 1005 calculates elevation value H2 from the detected atmospheric pressure information and uses the elevation value as the elevation value of the current position. Steps S2312 to S2315 correspond to steps S2210 to S2213 of FIG. 13.

When atmospheric pressure change ΔP is first threshold value ΔP1 or more (S2311: YES), the process proceeds to step S2316 and it is determined whether the IMES signal has been received and the elevation value has been acquired. When the elevation value is acquired from the IMES signal, the process proceeds to step S2317 and elevation value H1' obtained from the IMES signal is used as the elevation value of the current position and is stored as elevation value data 1112 in storage unit 1110. In step S2318, a user moves to a position where atmospheric pressure change ΔP is settled to second threshold value ΔP2 or less. If the change is settled, the process proceeds to step S2319 and the atmospheric pressure information is detected by atmospheric pressure information detection unit 1008. In step S2320, the calibration of second elevation value calculation unit 1005 is executed such that the elevation value calculated from the detected atmospheric pressure information becomes the elevation value of the current position.

When the elevation value is not acquired from the IMES signal (S2316: NO), the process proceeds to step S2321 and the user moves to the position where atmospheric pressure change ΔP is settled to second threshold value ΔP2 or less. If the change is settled, the process proceeds to step S2322, elevation value data 1112 stored in storage unit 1110 is used as the elevation value of the current position, and the process proceeds to step S2319.

After step S2310, step S2315, or step S2320, in step S2323, the map information and the elevation value of the current position are displayed on user interface unit 1011. In step S2324, the process continues until a command of a display end of the position information is received.

By the above configuration, the same effect as the first, second, and third embodiments can be obtained in the fourth embodiment. That is, in the case in which the atmospheric pressure information (the atmospheric pressure or the temperature) changes when the terminal device receives the IMES signal, the calibration is executed in a place where the atmospheric pressure or the temperature is stabilized. Therefore, a high-precision elevation value can be obtained.

Fifth Embodiment

In a fifth embodiment, a function of acquiring position information or information of an elevation value from an electronic tag (NFC tag) by near field communication device 214 is added to the first embodiment. For example, an URL of map information, position information, and an elevation value in a building are recorded on the NFC tag and the NFC tag is disposed in the vicinity of an entrance of the building. If terminal device 1 approaches the NFC tag, the URL of the map information, the position information, and the elevation value in the building can be acquired by proximity wireless communication and the map information in the building can be acquired from server device 7. As a result, a second elevation value calculation unit can be calibrated.

Figure 16:
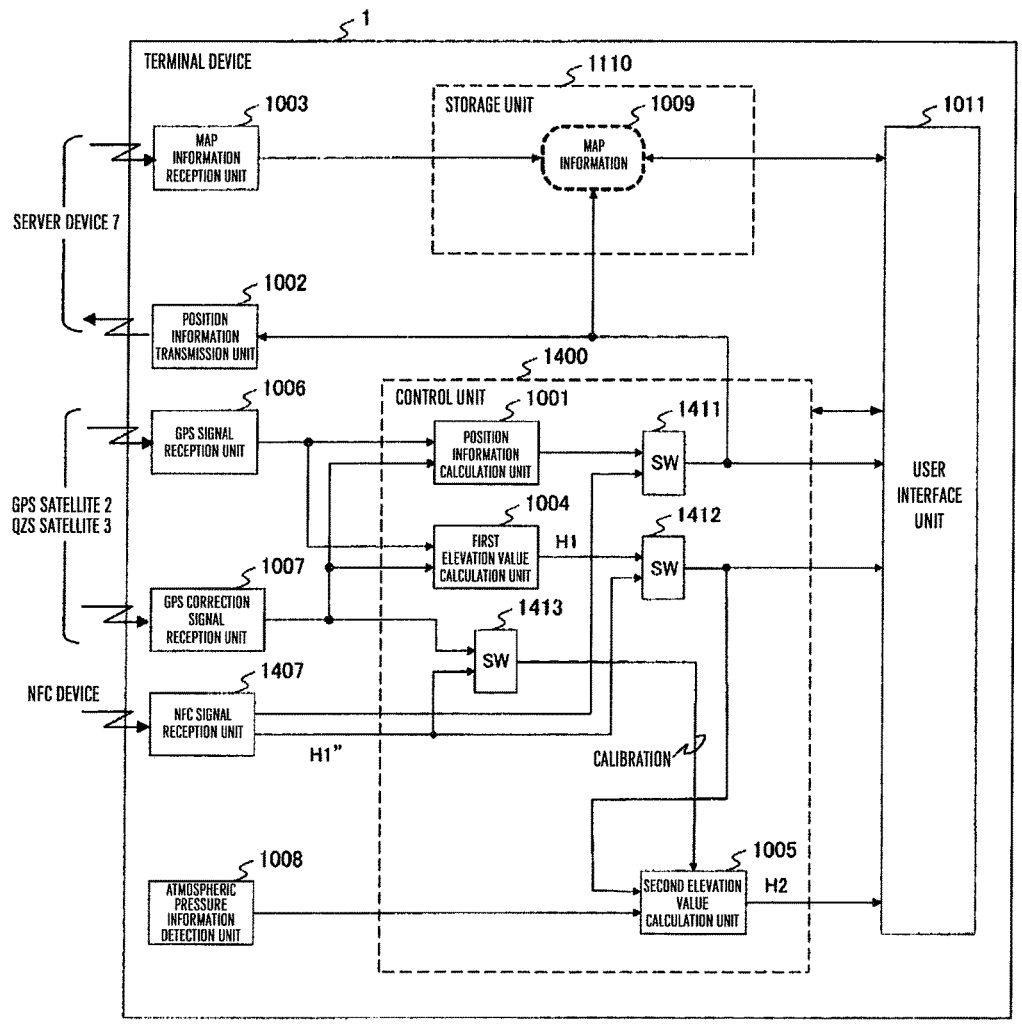
FIG. 16 is a functional block diagram of terminal device 1 according to a fifth embodiment.

FIG. 16 is a functional block diagram of terminal device 1 according to the fifth embodiment. The same functional blocks as those in the first embodiment (FIG. 3) are denoted with the same reference numerals and overlapped description is omitted.

Newly added NFC signal reception unit 1407 is configured, for example, by using near field communication device 214 illustrated in FIG. 2, and receives an NFC signal from the NFC tag and acquires the position information and the elevation value. At this time, because the position information and the elevation value are included in the received NFC signal, it is not necessary to calculate the position information and the elevation value by position information calculation unit 1001 or first elevation value calculation unit 1004 in control unit 1400. In addition, map information 1009 is acquired from server device 7 using the acquired position information. In addition, second elevation value calculation unit 1005 is calibrated using an elevation value (H1') acquired from the NFC signal.

Second elevation value calculation unit 1005 switches a process according to whether there is a GPS correction signal from GPS correction signal reception unit 1007 or there is the NFC signal from NFC signal reception unit 1407. When there is the GPS correction signal or the elevation value is acquired from the NFC signal, the calibration is executed.

Each of SW circuits 1411, 1412, and 1413 in control unit 1400 switches an input to the side of NFC signal reception unit 1407 only when the NFC signal is received and the position information or the elevation value acquired from the NFC signal is used instead of the position information or the elevation value calculated from the GPS signal (including a GPS correction signal). When the NFC signal is not received, the input is switched to the side of the GPS signal and the GPS correction signal and the same operation as the first embodiment (FIG. 3) is executed.

Figure 17:
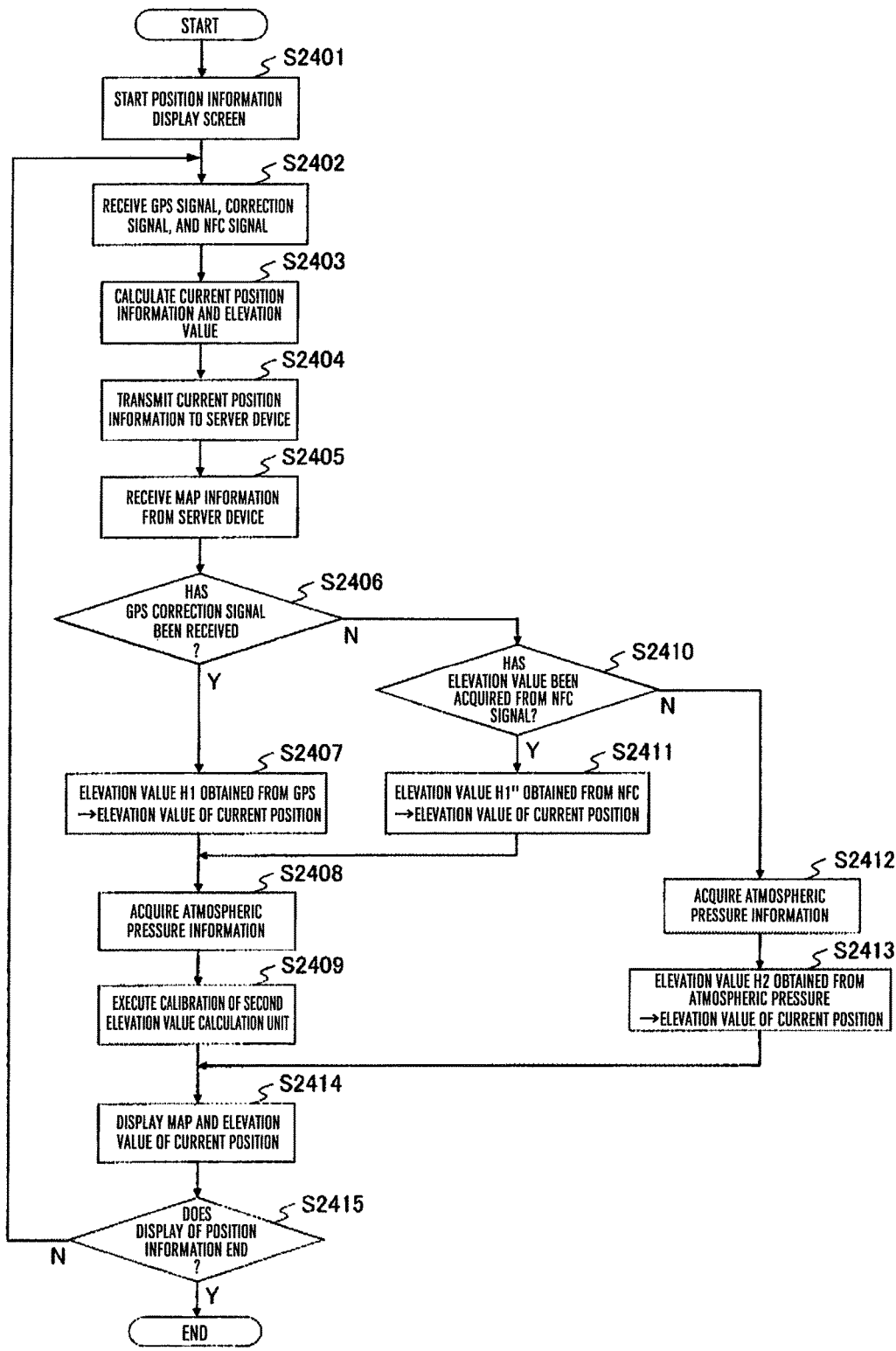
FIG. 17 is an operation sequence diagram illustrating a position information acquisition process in the fifth embodiment.

FIG. 17 is an operation sequence diagram illustrating a position information acquisition process in the fifth embodiment.

Processes of steps S2401 to S2405 are the same as those of steps S2001 to S2005 of the first embodiment (FIG. 4). However, in step S2402, the NFC signal is received from NFC signal reception unit 1407 in addition to the GPS signal, the GPS complementary signal, and the GPS correction signal, and in step S2403, the position information and the elevation value are calculated or acquired from the signals including the NFC signal.

In step S2406 the process is switched according to whether the GPS correction signal has been received in step S2402.

When the GPS correction signal is received (S2406: YES), the process proceeds to step S2407 and elevation value H1 calculated in step S2402 is used as an elevation value of a current position.

In step S2408, atmospheric pressure information detection unit 1008 detects atmospheric pressure information such as an atmospheric pressure and a temperature. In step S2409, the calibration of second elevation value calculation unit 1005 is executed such that elevation value H2 calculated from the atmospheric pressure information becomes the elevation value of the current position.

When the GPS correction signal is not received (S2406: NO), the process proceeds to step S2410 and it is determined whether the NFC signal has been received and the elevation value has been acquired. When the NFC signal has been received and the elevation value has been acquired (S2410: YES), the process proceeds to step S2411, elevation value H1" obtained from the NFC signal is used as the elevation value of the current position, and the process proceeds to step S2408.

When the NFC signal is not received or the elevation value is not acquired (S2410: NO), the process proceeds to step S2412 and the atmospheric pressure information such as the atmospheric pressure and the temperature is detected by atmospheric pressure information detection unit 1008. In step S2413, second elevation value calculation unit 1005 calculates elevation value H2 from the detected atmospheric pressure information and uses the elevation value as the elevation value of the current position.

After step S2409 or step S2413, in step S2414, the map information and the elevation value of the current position are displayed on user interface unit 1011. In step S2415, when a command of a display end of the position information is received, the process ends and when the command of the end is not received, the process returns to step S2202 and the process continues.

Figure 18:
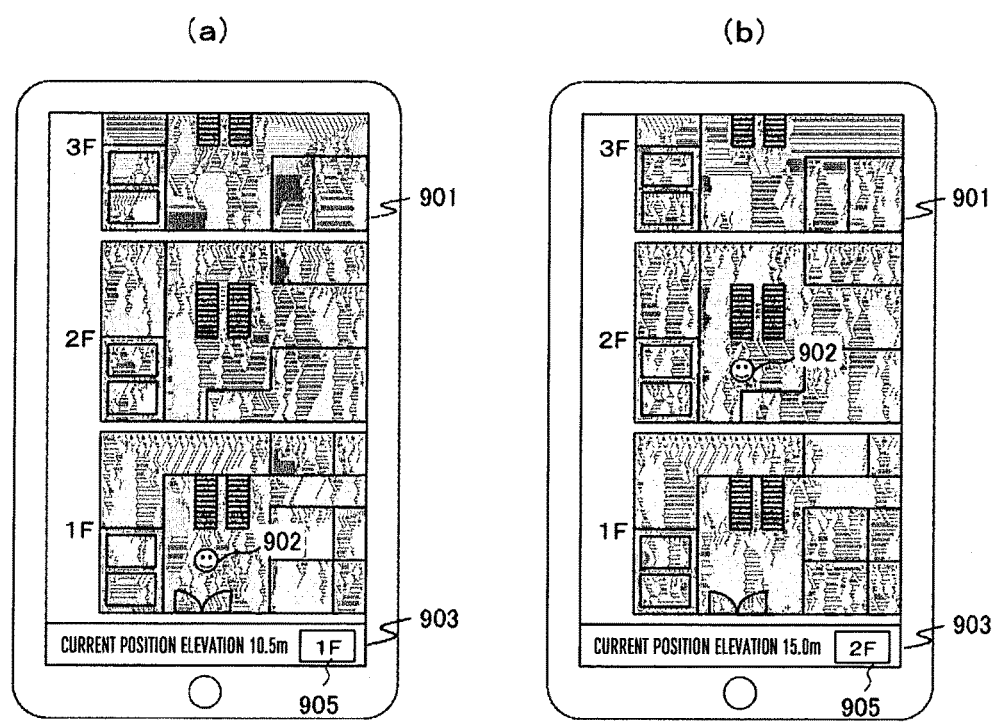
FIG. 18 is a diagram illustrating an example of a display screen of terminal device 1.

FIG. 18 illustrates an example of a display screen of terminal device 1 using the NFC signal. (a) and (b) illustrate display examples of position information at different positions in the building. For example, the NFC tag on which the URL of the map information, the position information, and the elevation value in the building are recorded is disposed in the vicinity of an entrance of 1F of the building.

In position information display screen 901 of (a), a user takes terminal device 1 near to the NFC tag in the vicinity of the entrance of 1F of the building, receives the URL of the map information, the position information, and the elevation value in the building, and acquires the map information from server device 7. An elevation value of current position 902 is displayed on guide display 903. In addition, the calibration of second elevation value calculation unit 1005 is executed by using the elevation value acquired from the NFC tag.

Screen 901 of (b) illustrates an example of the case in which the user moves to 2F in the building and the elevation value of current position 902 of the user is displayed on guide display 903. When the user moves to 2F in the building or moves to a place where there is a temperature difference, a high-precision elevation value can be calculated from the atmospheric pressure information and can be displayed. An elevation value of each floor of the building may be acquired from server device 7 and floor number 905 of the current position may be displayed on guide display 903.

By the above configuration, the same effect as the first embodiment can be obtained in the fifth embodiment. In the fifth embodiment, the NFC signal is received in addition to the GPS signal, the elevation value is calculated/acquired, and the calibration of the second elevation value calculation unit is executed by using the acquired elevation value. As a result, even when the GPS signal is not received, the GPS signal is supplemented with the NFC signal and a high-precision elevation value can be obtained seamlessly.

Sixth Embodiment

A sixth embodiment has a configuration in which the atmospheric pressure difference cancellation function according to the second embodiment and the NFC signal reception function according to the fifth embodiment are combined.

Figure 19:
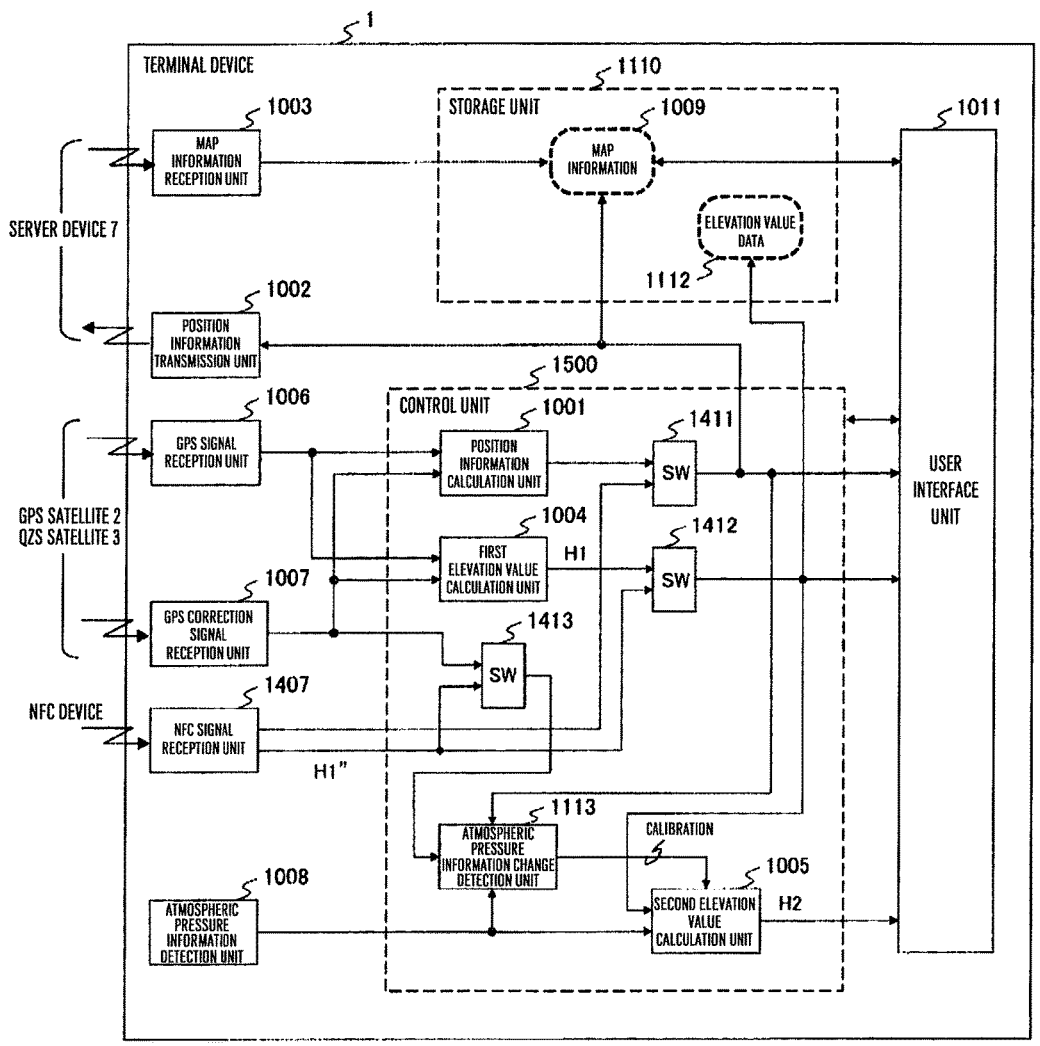
FIG. 19 is a functional block diagram of terminal device 1 according to a sixth embodiment.

FIG. 19 is a functional block diagram of terminal device 1 according to the sixth embodiment. The same functional blocks as those in the second embodiment (FIG. 7) and the fifth embodiment (FIG. 16) are denoted with the same reference numerals and overlapped description is omitted.

In control unit 1500, an NFC signal from NFC signal reception unit 1407 is input and position information and an elevation value (H1") are acquired. Meanwhile, position information and an elevation value (H1) are calculated by a GPS signal (including a GPS correction signal) and SW circuits 1411, 1412, and 1413 switches these. The acquired elevation values (H1 and H1") are stored as elevation value data 1112 in storage unit 1110. In second elevation value calculation unit 1005, first calibration is executed by using the acquired elevation values (H1 and H1").

In addition, atmospheric pressure information change detection unit 1113 is provided in control unit 1500 and acquires a change in the atmospheric pressure information detected by atmospheric pressure information detection unit 1008. When atmospheric pressure change $\Delta P$ is first threshold value $\Delta P1$ or more, second calibration is executed with respect to second elevation value calculation unit 1005, using elevation value data 1112 stored in storage unit 1110, after atmospheric pressure change $\Delta P$ is settled to second threshold value $\Delta P2$ or less.

Figure 20:
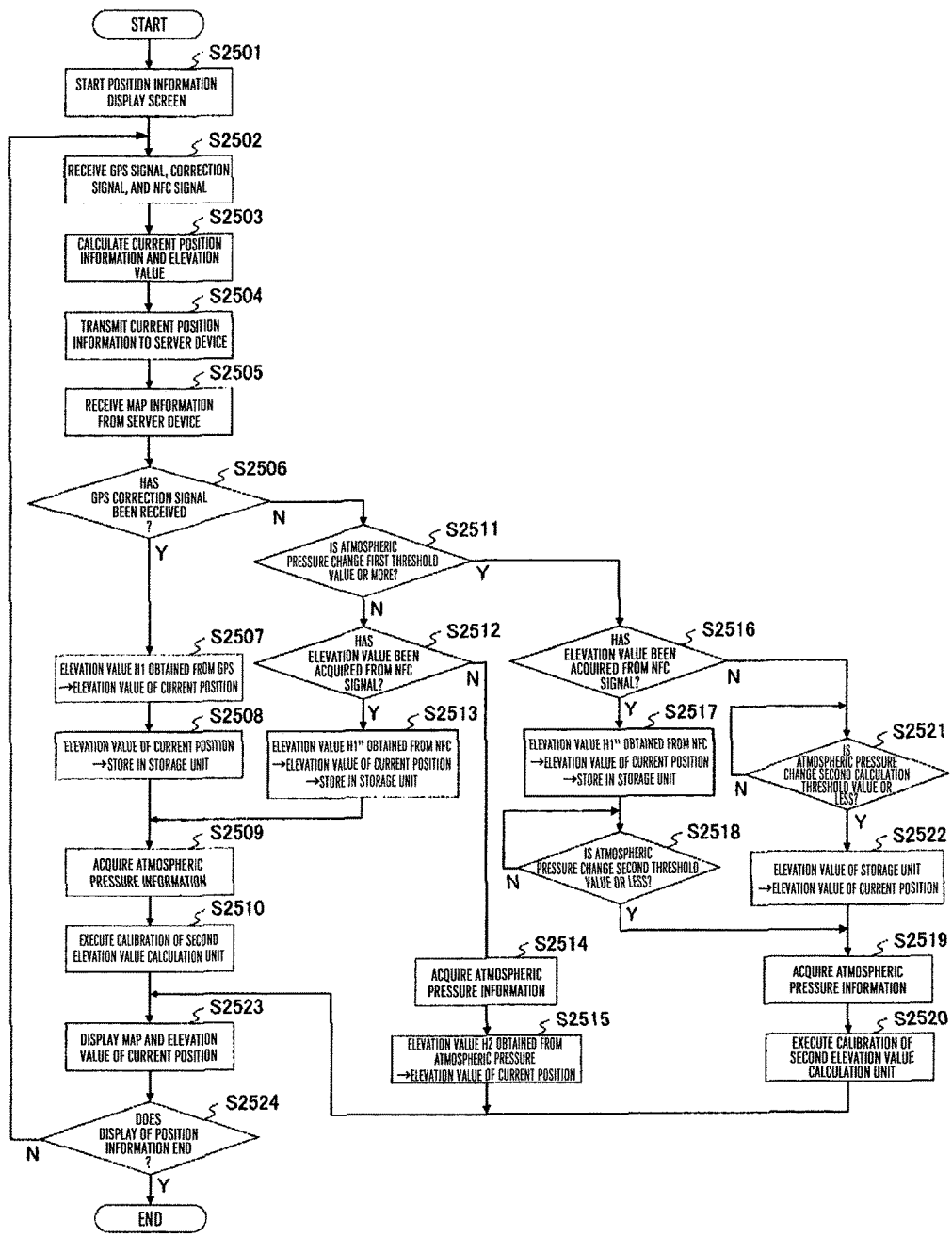
FIG. 20 is an operation sequence diagram illustrating a position information acquisition process in the sixth embodiment.

FIG. 20 is an operation sequence diagram illustrating a position information acquisition process in the sixth embodiment. This sequence is obtained by combining the second embodiment (FIG. 8) and the fifth embodiment (FIG. 17).

Processes of steps S2501 to S2505 are the same as those of steps S2401 to S2405 of FIG. 17. An NFC signal is received in addition to a GPS signal, a GPS complementary signal, and a GPS correction signal, and position information and an elevation value are calculated or acquired.

When the GPS correction signal is received (S2506: YES), steps S2507 to S2510 are executed which correspond to steps S2107 to S2110 of FIG. 8. That is, elevation value H1 calculated from the GPS signal (including the correction signal) is used as an elevation value of a current position and is stored as elevation value data 1112 in storage unit 1110. In addition, atmospheric pressure information is detected and calibration of second elevation value calculation unit 1005 is executed such that an elevation value calculated from the atmospheric pressure information becomes the elevation value of the current position.

When the GPS correction signal is not received (S2506: NO), the process proceeds to step S2511 and atmospheric pressure change ΔP is detected by atmospheric pressure information change detection unit 1113 and is compared with first threshold value ΔP1. When atmospheric pressure change ΔP is not threshold value ΔP1 or more (S2511: NO), the process proceeds to step S2512 and it is determined whether the NFC signal has been received and the elevation value has been acquired. When the elevation value is acquired from the NFC signal, the process proceeds to step S2513 and elevation value H1" obtained from the NFC signal is used as the elevation value of the current position and is stored as elevation value data 1112 in storage unit 1110. Then the process proceeds to step S2509.

When the elevation value is not acquired from the NFC signal (S2512: NO), steps S2514 and S2515 are executed and second elevation value calculation unit 1005 calculates elevation value H2 from the detected atmospheric pressure information and uses the elevation value as the elevation value of the current position. Steps S2512 to S2515 correspond to steps S2410 to S2413 of FIG. 17.

When atmospheric pressure change ΔP is threshold value ΔP1 or more (S2511: YES), the process proceeds to step S2516 and it is determined whether the NFC signal has been received and the elevation value has been acquired. When the elevation value is acquired from the NFC signal, the process proceeds to step S2517 and elevation value H1" obtained from the NFC signal is used as the elevation value of the current position and is stored as elevation value data 1112 in storage unit 1110. In step S2518, a user moves to a position where atmospheric pressure change ΔP is settled to second threshold value ΔP2 or less. If the change is settled, the process proceeds to step S2519 and the atmospheric pressure information is detected by atmospheric pressure information detection unit 1008. In step S2520, the calibration of second elevation value calculation unit 1005 is executed such that the elevation value calculated from the detected atmospheric pressure information becomes the elevation value of the current position.

When the elevation value is not acquired from the NFC signal (S2516: NO), the process proceeds to step S2521 and the user moves to the position where the atmospheric pressure change is settled to second threshold value ΔP2 or less. If the change is settled, the process proceeds to step S2522, elevation value data 1112 stored in storage unit 1110 is used as the elevation value of the current position, and the process proceeds to step S2519.

After step S2510, step S2515, or step S2520, in step S2523, the map information and the elevation value of the current position are displayed on user interface unit 1011. In step S2524, the process continues until a command of a display end of the position information is received.

By the above configuration, the same effect as the first, second, and fifth embodiments can be obtained in the sixth embodiment. That is, in the case in which the atmospheric pressure information (the atmospheric pressure or the temperature) changes when the terminal device receives the NFC signal, the calibration is executed in a place where the atmospheric pressure or the temperature is stabilized. Therefore, a high-precision elevation value can be obtained.

The embodiments described above are described in detail to facilitate the understanding of the present invention and are not limited to embodiments in which all of the described configurations are included. In addition, a part of the configurations of the certain embodiment can be replaced with the configurations of other embodiment or the configurations of other embodiment can be added to the configurations of the certain embodiment. In addition, for a part of the configurations of the individual embodiments, other configurations can be added, removed, or replaced.

In addition, a part or all of the individual configurations, functions, processing units, and processing mechanisms may be designed by integrated circuits and may be realized by hardware. In addition, the individual configurations and functions may be realized by software by analyzing programs for realizing the individual functions by a processor and executing the programs by the processor. Information such as the programs, the tables, and the files for realizing the individual functions may be stored in a recording device such as a memory, a hard disk, and a solid state drive (SSD) or a recording medium such as an IC card and an SD card.

In addition, only control lines or information lines thought to be necessary for explanation are illustrated, and all control lines or information lines for a product are not necessarily illustrated. In actuality, it may be regarded that almost all configurations are connected to each other.

REFERENCE SIGNS LIST

1: terminal device, 2: GPS satellite, 3: QZS satellite, 7: server device, 201: CPU, 202: memory, 203: GPS receiver, 207: atmospheric pressure sensor, 208: temperature sensor, 209: operation device, 210: display, 214: near field communication device, 215: LAN communication device, 216: mobile communication device, 1000, 1100, 1200, 1300, 1400, 1500: control unit, 1001: position information calculation unit, 1002: position information transmission unit, 1003: map information reception unit, 1004: first elevation value calculation unit, 1005: second elevation value calculation unit, 1006: GPS signal reception unit, 1007: GPS correction signal reception unit, 1008: atmospheric pressure information detection unit, 1010, 1110: storage unit, 1011: user interface unit, 1113: atmospheric pressure information change detection unit, 1207: IMES signal reception unit, 1407: NFC signal reception unit

The invention claimed is:

1. A terminal device for acquiring an elevation value of a current position using a global positioning system (GPS), the terminal device comprising:

a GPS signal reception unit that receives a GPS signal and a GPS correction signal correcting the GPS signal from a GPS satellite and a QZS satellite complementing the GPS satellite;

a first elevation value calculation unit that calculates the elevation value of the current position from the GPS signal and the GPS correction signal;

an atmospheric pressure information detection unit that detects atmospheric pressure information including an ambient atmospheric pressure and ambient temperature of the terminal device;

a second elevation value calculation unit that calculates the elevation value of the current position from the atmospheric pressure information; and a control unit that controls an operation of each unit, wherein, when the GPS signal reception unit receives the GPS correction signal, the control unit uses the elevation value calculated by the first elevation value calculation unit as the elevation value of the current position and calibrates the second elevation value calculation unit using the elevation value calculated by the first elevation value calculation unit, and when the GPS signal reception unit does not receive the GPS correction signal, the control unit uses the elevation value calculated by the calibrated second elevation value calculation unit as the elevation value of the current position.

2. The terminal device according to claim 1, comprising:
a storage unit that stores the elevation value calculated by the first elevation value calculation unit; and
an atmospheric pressure information change detection unit that detects a change in the atmospheric pressure information for a change in the current position,
wherein, when the GPS signal reception unit receives the GPS correction signal, the control unit stores the elevation value calculated by the first elevation value calculation unit in the storage unit, and
when the GPS signal reception unit does not receive the GPS correction signal and the change in the atmospheric pressure information detected by the atmospheric pressure information change detection unit is a first threshold value or more, the control unit uses the elevation value stored in the storage unit as the elevation value of the current position and calibrates the second elevation value calculation unit using the elevation value stored in the storage unit, at a position where the change in the atmospheric pressure information is settled to a second threshold value or less thereafter.

3. The terminal device according to claim 1, comprising:
a signal reception unit that receives an a signal for positioning indoors from an indoor GPS transmitter,
wherein, when the GPS signal reception unit does not receive the GPS correction signal, the control unit uses an elevation value acquired from the signal for positioning indoors by the signal reception unit as the elevation value of the current position and calibrates the second elevation value calculation unit using the acquired elevation value, and
when the signal reception unit does not acquire the elevation value from the signal for positioning indoors, the control unit uses the elevation value calculated by the calibrated second elevation value calculation unit as the elevation value of the current position.

4. The terminal device according to claim 3, comprising:
a storage unit that stores the elevation value calculated or acquired by the first elevation value calculation unit or the signal reception unit; and
an atmospheric pressure information change detection unit that detects a change in the atmospheric pressure information for a change in the current position,
wherein, when the GPS signal reception unit receives the GPS correction signal, the control unit stores the elevation value calculated by the first elevation value calculation unit in the storage unit and when the GPS signal reception unit does not receive the GPS correction signal and the signal reception unit acquires the elevation value from the signal for positioning indoors, the control unit stores the acquired elevation value in the storage unit, and
when the GPS signal reception unit does not receive the GPS correction signal and the change in the atmospheric pressure information detected by the atmospheric pressure information change detection unit is a first threshold value or more, the control unit uses the elevation value stored in the storage unit as the elevation value of the current position and calibrates the second elevation value calculation unit using the elevation value stored in the storage unit, at a position where the change in the atmospheric pressure information is settled to a second threshold value or less thereafter.

5. The terminal device according to claim 1, comprising:
an NFC signal reception unit that receives an NFC signal from an electronic tag by near field communication (NFC),
wherein, when the GPS signal reception unit does not receive the GPS correction signal, the control unit uses an elevation value acquired from the NFC signal by the NFC signal reception unit as the elevation value of the current position and calibrates the second elevation value calculation unit using the acquired elevation value, and
when the NFC signal reception unit does not acquire the elevation value from the NFC signal, the control unit uses the elevation value calculated by the calibrated second elevation value calculation unit as the elevation value of the current position.

6. The terminal device according to claim 5, comprising:
a storage unit that stores the elevation value calculated or acquired by the first elevation value calculation unit or the NFC signal reception unit; and
an atmospheric pressure information change detection unit that detects a change in the atmospheric pressure information for a change in the current position,
wherein, when the GPS signal reception unit receives the GPS correction signal, the control unit stores the elevation value calculated by the first elevation value calculation unit in the storage unit and when the GPS signal reception unit does not receive the GPS correction signal and the NFC signal reception unit acquires the elevation value from the NFC signal, the control unit stores the acquired elevation value in the storage unit, and
when the GPS signal reception unit does not receive the GPS correction signal and the change in the atmospheric pressure information detected by the atmospheric pressure information change detection unit is a first threshold value or more, the control unit uses the elevation value stored in the storage unit as the elevation value of the current position and calibrates the second elevation value calculation unit using the elevation value stored in the storage unit, at a position where the change in the atmospheric pressure information is settled to a second threshold value or less thereafter.

7. The terminal device according to claim 1, comprising:
a map information acquisition unit that calculates or acquires position information of the current position from the GPS signal and the GPS correction signal, the signal for positioning indoors, or the NFC signal and acquires map information for the current position; and
a display that displays the current position on the acquired map information and displays the elevation value of the acquired current position.

8. The terminal device according to claim 7,
wherein the control unit determines whether the current position is inside or outside a structure or a floor number in the structure, by referring to the acquired map information, based on whether the GPS signal reception unit has received the GPS correction signal or the change in the atmospheric pressure information detected by the atmospheric pressure information change detection unit, and displays a determination result on the display.

9. An elevation value acquisition method for acquiring an elevation value of a current position using a global positioning system (GPS), the elevation value acquisition method comprising:

a GPS signal reception step of receiving a GPS signal and a GPS correction signal correcting the GPS signal from a GPS satellite and a QZS satellite complementing the GPS satellite;

a first elevation value calculation step of calculating an elevation value of the current position from the GPS signal and the GPS correction signal;

an atmospheric pressure information detection step of detecting atmospheric pressure information including an ambient atmospheric pressure and an ambient temperature;

a second elevation value calculation step of calculating an elevation value from the atmospheric pressure information; and a calibration step of calibrating a calculation method in the second elevation value calculation step, wherein, when the GPS correction signal is received in the GPS signal reception step, the elevation value calculated in the first elevation value calculation step is used as the elevation value of the current position and the calibration of the second elevation value calculation step is executed using the elevation value calculated in the first elevation value calculation step, and when the GPS correction signal is not received in the GPS signal reception step, the elevation value calculated in the calibrated second elevation value calculation step is used as the elevation value of the current position.

10. The elevation value acquisition method according to claim 9, comprising:

a storage step of storing the elevation value calculated in the first elevation value calculation step in a storage unit, when the GPS correction signal is received in the GPS signal reception step; and an atmospheric pressure information change detection step of detecting a change in the atmospheric pressure information for a change in the current position, wherein, when the GPS correction signal is not received by the GPS signal reception step and the change in the atmospheric pressure information detected by the atmospheric pressure information change detection step is a first threshold value or more, the elevation value stored in the storage unit is used as the elevation value of the current position and the calibration of the second elevation value calculation step is executed using the elevation value stored in the storage unit, at a position where the change in the atmospheric pressure information is settled to a second threshold value or less thereafter.

11. The terminal device according to any one of claim 2, comprising:

a map information acquisition unit that calculates or acquires position information of the current position from the GPS signal and the GPS correction signal, the signal for positioning indoors, or the NFC signal and acquires map information for the current position; and a display that displays the current position on the acquired map information and displays the elevation value of the acquired current position.

12. The terminal device according to any one of claim 3, comprising:

a map information acquisition unit that calculates or acquires position information of the current position from the GPS signal and the GPS correction signal, the signal for positioning indoors, or the NFC signal and acquires map information for the current position; and a display that displays the current position on the acquired map information and displays the elevation value of the acquired current position.

13. The terminal device according to any one of claim 4, comprising:

a map information acquisition unit that calculates or acquires position information of the current position from the GPS signal and the GPS correction signal, the signal for positioning indoors, or the NFC signal and acquires map information for the current position; and a display that displays the current position on the acquired map information and displays the elevation value of the acquired current position.

14. The terminal device according to any one of claim 5, comprising:

a map information acquisition unit that calculates or acquires position information of the current position from the GPS signal and the GPS correction signal, the signal for positioning indoors, or the NFC signal and acquires map information for the current position; and a display that displays the current position on the acquired map information and displays the elevation value of the acquired current position.

15. The terminal device according to any one of claim 6, comprising:

a map information acquisition unit that calculates or acquires position information of the current position from the GPS signal and the GPS correction signal, the signal for positioning indoors, or the NFC signal and acquires map information for the current position; and a display that displays the current position on the acquired map information and displays the elevation value of the acquired current position.

16. The terminal device according to claim 11, wherein the control unit determines whether the current position is inside or outside a structure or a floor number in the structure, by referring to the acquired map information, based on whether the GPS signal reception unit has received the GPS correction signal or the change in the atmospheric pressure information detected by the atmospheric pressure information change detection unit, and displays a determination result on the display.

17. The terminal device according to claim 12, wherein the control unit determines whether the current position is inside or outside a structure or a floor number in the structure, by referring to the acquired map information, based on whether the GPS signal reception unit has received the GPS correction signal or the change in the atmospheric pressure information detected by the atmospheric pressure information change detection unit, and displays a determination result on the display.

18. The terminal device according to claim 13, wherein the control unit determines whether the current position is inside or outside a structure or a floor number in the structure, by referring to the acquired map information, based on whether the GPS signal reception unit has received the GPS correction signal or the change in the atmospheric pressure information detected by the atmospheric pressure information change detection unit, and displays a determination result on the display.

19. The terminal device according to claim 14, wherein the control unit determines whether the current position is inside or outside a structure or a floor number in the structure, by referring to the acquired map information, based on whether the GPS signal reception unit has received the GPS correction signal or the change in the atmospheric pressure information detected by the atmospheric pressure information change detection unit, and displays a determination result on the display.

20. The terminal device according to claim 15,
wherein the control unit determines whether the current position is inside or outside a structure or a floor number in the structure, by referring to the acquired map information, based on whether the GPS signal reception unit has received the GPS correction signal or the change in the atmospheric pressure information detected by the atmospheric pressure information change detection unit, and displays a determination result on the display.

* * * * *